(12) United States Patent
Carvajal et al.

(10) Patent No.: US 9,172,897 B2
(45) Date of Patent: Oct. 27, 2015

(54) AUDIO/VISUAL DEVICE GRAPHICAL USER INTERFACE

(75) Inventors: Santiago Carvajal, West Newton, MA (US); Eric E. Dolecki, Framingham, MA (US); Neil W. Griffiths, Lexington, MA (US); John Michael Sakalowsky, West Newton, MA (US); Conor Sheehan, Arlington, MA (US); Benjamin D. Burge, Shaker Heights, OH (US)

(73) Assignee: Bose Corporation, Framingham, MA (US)

( * ) Notice: Subject to any disclaimer, the term of this patent is extended or adjusted under 35 U.S.C. 154(b) by 707 days.

(21) Appl. No.: 13/448,540

(22) Filed: Apr. 17, 2012

(65) Prior Publication Data

US 2012/0200775 A1 Aug. 9, 2012

Related U.S. Application Data

(63) Continuation of application No. 12/613,945, filed on Nov. 6, 2009.

(51) Int. Cl.
| | | |
|---|---|---|
| *H04N 5/445* | (2011.01) | |
| *H04N 5/44* | (2011.01) | |
| *G06F 3/0354* | (2013.01) | |
| *G06F 3/0481* | (2013.01) | |

(Continued)

(52) U.S. Cl.
CPC .......... *H04N 5/4403* (2013.01); *G06F 3/03547* (2013.01); *G06F 3/0482* (2013.01); *G06F 3/0488* (2013.01); *G06F 3/04812* (2013.01); *H04N 21/42204* (2013.01); *H04N 21/42224* (2013.01); *H04N 21/4316* (2013.01); *H04N 2005/443* (2013.01)

(58) Field of Classification Search
CPC .......... H04N 5/44513; H04N 5/44504; H04N 5/44503; G06F 3/0482; G06F 3/0481
USPC ........................................... 715/810; 348/564
See application file for complete search history.

(56) References Cited

U.S. PATENT DOCUMENTS

| | | |
|---|---|---|
| 4,825,209 A | 4/1989 | Sasaki et al. |
| 5,327,160 A | 7/1994 | Asher |

(Continued)

FOREIGN PATENT DOCUMENTS

| | | |
|---|---|---|
| EP | 0838945 A2 | 4/1998 |
| EP | 1052849 A1 | 11/2000 |

(Continued)

OTHER PUBLICATIONS

International Search Report and Written Opinion dated Apr. 8, 2011 for PCT/US2010/054612.

(Continued)

*Primary Examiner* — Anil Bhargava
(74) *Attorney, Agent, or Firm* — Bose Corporation

(57) ABSTRACT

A user interface for an audio/visual device incorporates one or both of a touch sensor having a touch surface on which is defined a racetrack surface having a ring shape and a display element on which is displayed a racetrack menu also having a ring shape, and where the user interface incorporates both, the ring shapes of the racetrack surface and the racetrack menu are structured to generally correspond such that the position of a marker on the racetrack menu is caused to correspond to the position at which a digit of a user's hand touches the racetrack surface.

26 Claims, 18 Drawing Sheets

(51) Int. Cl.
  *G06F 3/0482* (2013.01)
  *G06F 3/0488* (2013.01)
  *H04N 21/422* (2011.01)
  *H04N 21/431* (2011.01)

(56) References Cited

U.S. PATENT DOCUMENTS

| | | | |
|---|---|---|---|
| 5,367,199 A | 11/1994 | Lefkowitz et al. | |
| 5,371,553 A | 12/1994 | Kawamura et al. | |
| 5,408,275 A | 4/1995 | Song et al. | |
| 5,508,703 A | 4/1996 | Okamura et al. | |
| 5,545,857 A | 8/1996 | Lee et al. | |
| 5,589,893 A | 12/1996 | Gaughan et al. | |
| 5,691,778 A | 11/1997 | Song | |
| 5,790,820 A * | 8/1998 | Vayda et al. | 715/834 |
| 5,990,890 A | 11/1999 | Etheredge | |
| 6,094,156 A | 7/2000 | Henty | |
| 6,215,417 B1 | 4/2001 | Krass et al. | |
| 6,313,851 B1 | 11/2001 | Matthews, III et al. | |
| 6,396,523 B1 | 5/2002 | Segal et al. | |
| 6,538,643 B2 | 3/2003 | Mori et al. | |
| 6,574,083 B1 | 6/2003 | Krass et al. | |
| 6,633,281 B2 | 10/2003 | Lin et al. | |
| 6,701,525 B1 | 3/2004 | Neervoort et al. | |
| 6,750,803 B2 | 6/2004 | Yates et al. | |
| 6,765,557 B1 | 7/2004 | Segal et al. | |
| 6,957,386 B2 | 10/2005 | Nishina et al. | |
| 7,036,091 B1 | 4/2006 | Nguyen | |
| 7,174,518 B2 | 2/2007 | Kim | |
| 7,225,413 B1 | 5/2007 | Kuenzner et al. | |
| 7,574,672 B2 | 8/2009 | Jobs et al. | |
| 7,581,182 B1 * | 8/2009 | Herz | 715/713 |
| 2002/0154888 A1 | 10/2002 | Allen et al. | |
| 2002/0180707 A1 | 12/2002 | Sato et al. | |
| 2005/0151727 A1 | 7/2005 | Kwong | |
| 2005/0264538 A1 | 12/2005 | Yeh | |
| 2006/0112352 A1* | 5/2006 | Tseng et al. | 715/810 |
| 2006/0119585 A1 | 6/2006 | Skinner | |
| 2006/0279541 A1* | 12/2006 | Kim et al. | 345/158 |
| 2007/0105591 A1 | 5/2007 | Chan | |
| 2007/0157095 A1* | 7/2007 | Bilow et al. | 715/744 |
| 2007/0220418 A1* | 9/2007 | Matsui et al. | 715/511 |
| 2007/0220440 A1* | 9/2007 | Song et al. | 715/776 |
| 2007/0256029 A1 | 11/2007 | Maxwell | |
| 2007/0273649 A1 | 11/2007 | Matsui et al. | |
| 2008/0030463 A1 | 2/2008 | Forest | |
| 2008/0127267 A1* | 5/2008 | Choi | 725/43 |
| 2009/0077497 A1* | 3/2009 | Cho et al. | 715/814 |
| 2009/0109183 A1 | 4/2009 | Carvajal et al. | |
| 2009/0210815 A1* | 8/2009 | Cheng et al. | 715/773 |
| 2009/0254864 A1 | 10/2009 | Whittington et al. | |
| 2010/0073567 A1 | 3/2010 | Lee et al. | |
| 2010/0289756 A1* | 11/2010 | Anzures et al. | 345/173 |
| 2011/0066980 A1 | 3/2011 | Chmielewski et al. | |
| 2013/0047123 A1* | 2/2013 | May et al. | 715/834 |

FOREIGN PATENT DOCUMENTS

| | | |
|---|---|---|
| EP | 1655953 A1 | 5/2006 |
| EP | 1944677 A2 | 7/2008 |
| JP | 2007066031 A | 3/2007 |
| WO | 9934564 A1 | 7/1999 |
| WO | 20051109165 A2 | 11/2005 |
| WO | 20071040531 A1 | 4/2007 |
| WO | 20081038882 A1 | 4/2008 |

OTHER PUBLICATIONS

Daily Record, Oct. 6, 2007: "Gadgets and Gizmos"; www.sony.co.uk.

Invitation to Pay Additional Fees dated Feb. 18, 2011 for PCT/US2010/054612.

* cited by examiner

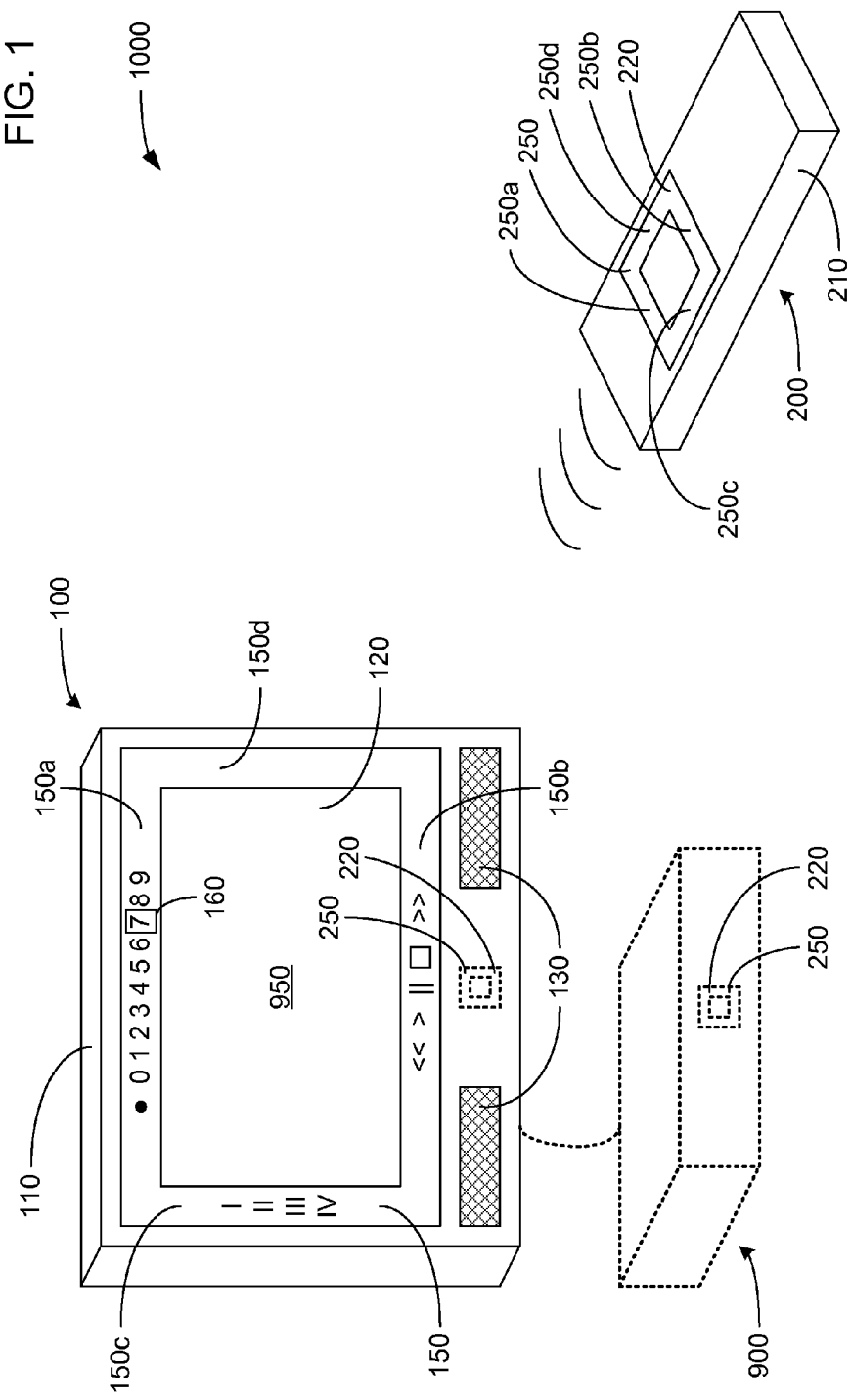

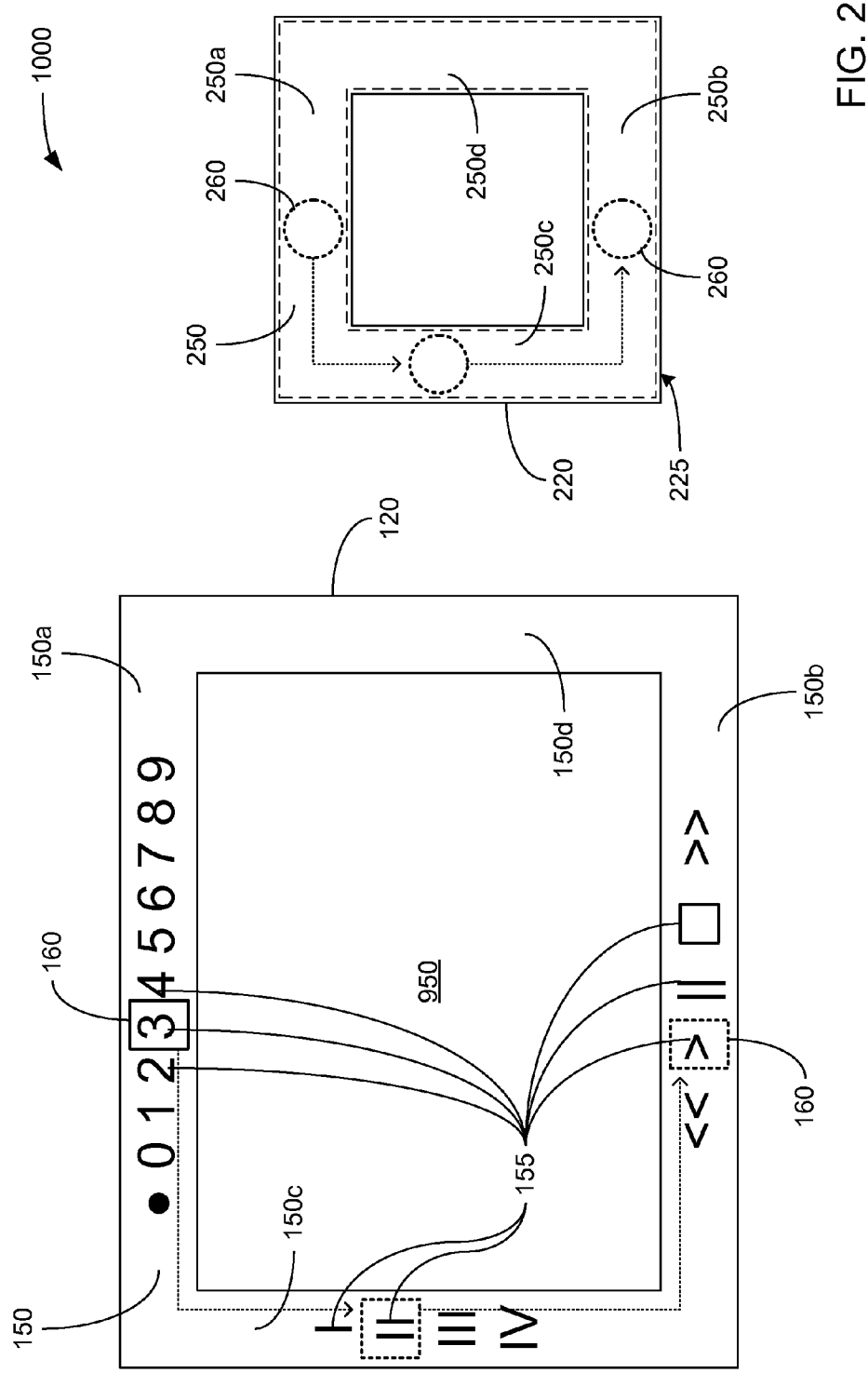

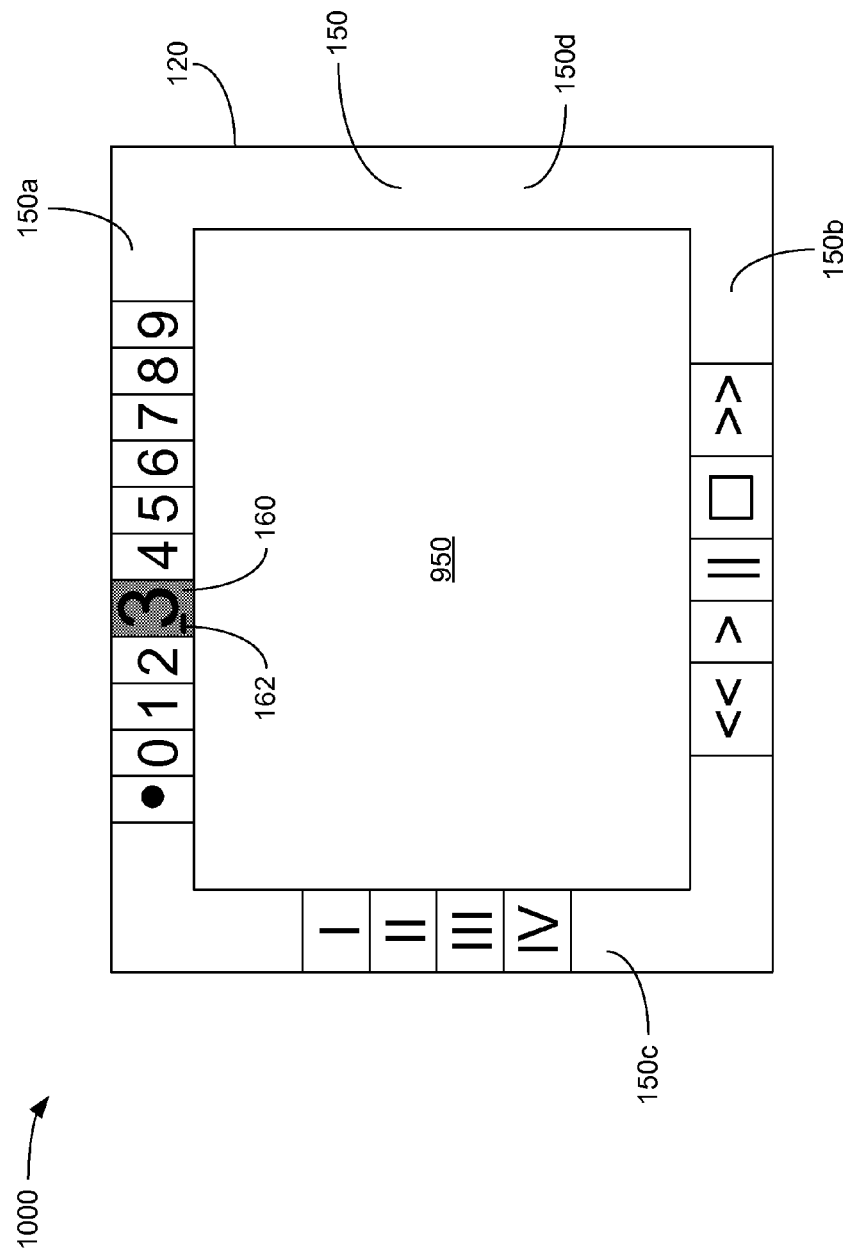

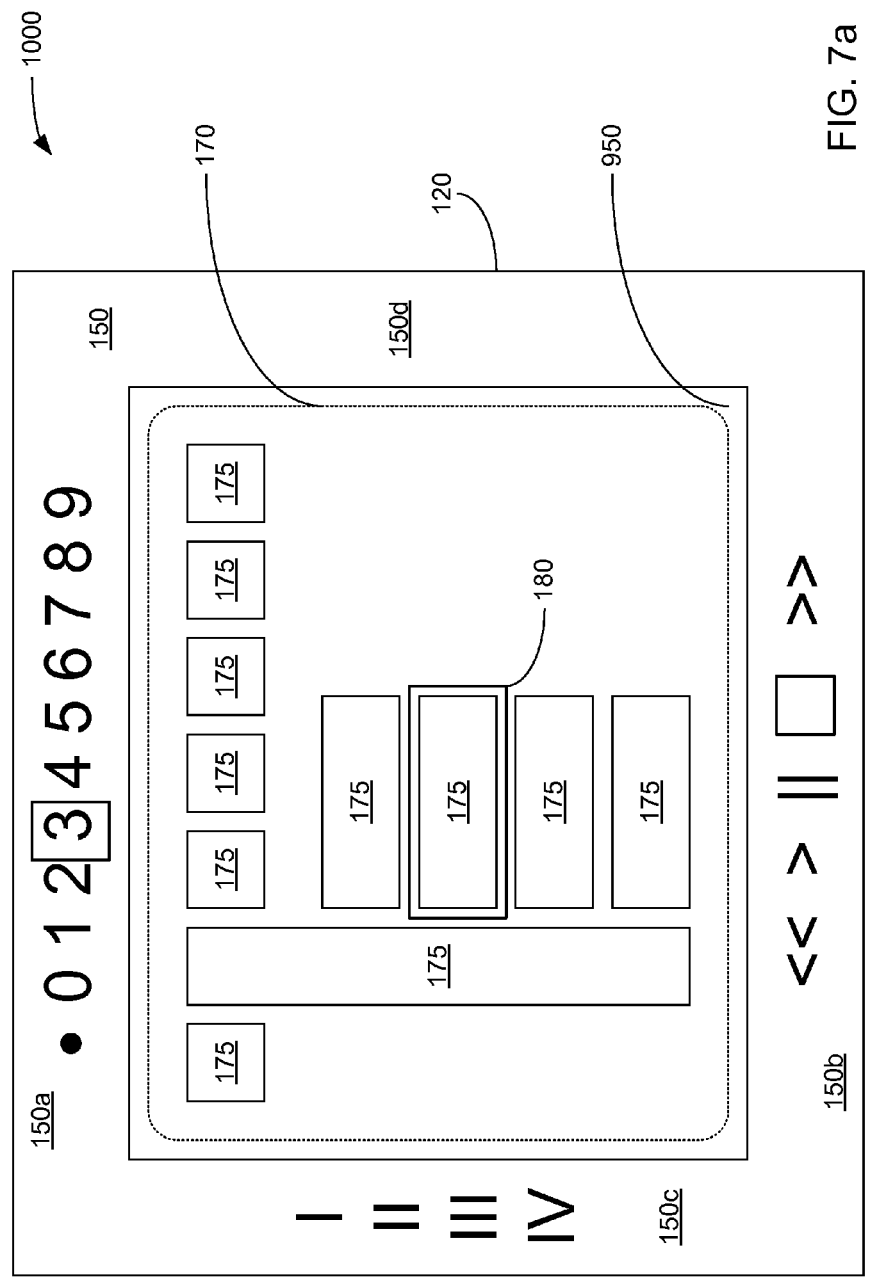

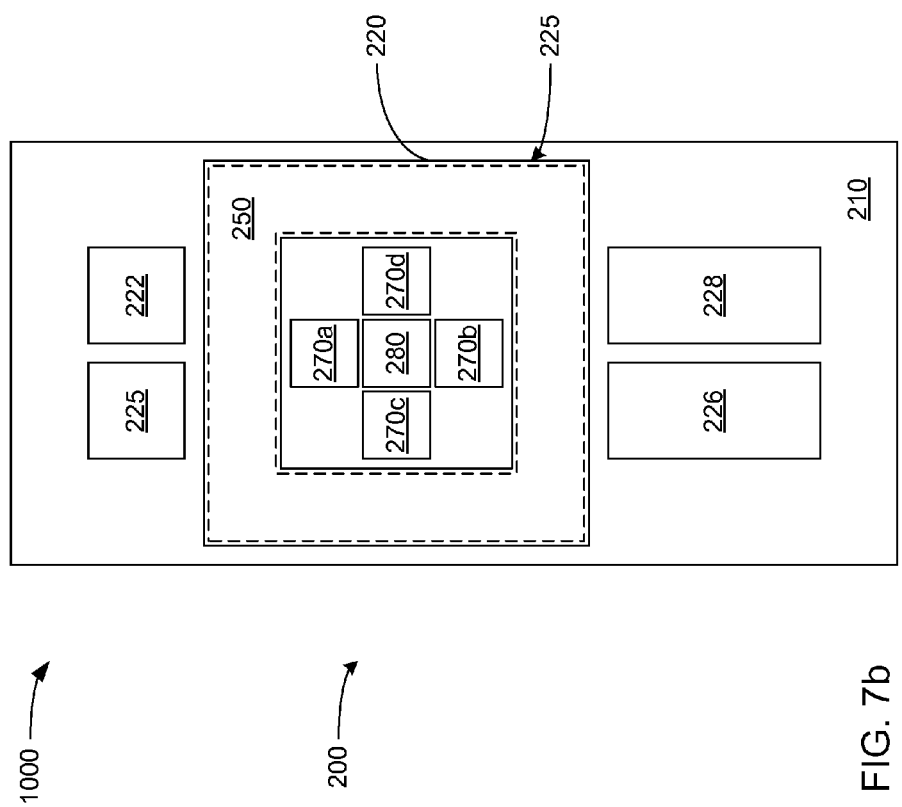

AUDIO/VISUAL DEVICE GRAPHICAL USER INTERFACE

CROSS-REFERENCE TO RELATED APPLICATION

This present application is a continuation of application Ser. No. 12/613,945 filed Nov. 6, 2009 by Santiago Carvajal, Eric E. Dolecki, Neil W. Griffiths, John Michael Sakalowsky, Conor Sheehan and Benjamin Douglass Burge, the disclosure of which is incorporated herein by reference.

TECHNICAL FIELD

This disclosure relates to user interfaces incorporating a visual display and/or a touch-sensitive control.

BACKGROUND

Part of enjoying the playing of an audio/visual program (e.g., a piece of music, a recorded lecture, a recorded live performance, a movie, a slideshow, family pictures, an episode of a television program, etc.) is the task of selecting the desired audio/visual program to be played. Unfortunately, the increasing variety of choices of sources of audio/visual programs and the increasing variety of mechanisms by which audio/visual programs are able to be stored and played has greatly complicated what was once the relatively simple act of watching or listening to the playing of an audio/visual program to enjoy it.

For example, those wishing to "tune in" an audio/visual program being broadcast must now select a channel on which to view an audio/visual program from as many as 500 channels available through typical cable and/or satellite connections for television and/or radio. Further, it has become commonplace to employ audio/visual devices that are able to be programmed to autonomously tune in and record an audio/visual program for playing at a later time. Still further, it is now becoming increasingly commonplace to obtain audio/visual programs from websites accessible through the Internet, either by receiving those audio/visual programs as streaming data while they are played, or downloading those audio/visual programs as a storable digital file on an audio/visual device for playing at a later time. Yet further, some of these possible sources of audio/visual programs require paid subscriptions for which key cards and/or decryption keys are required to gain access to at least some audio/visual programs.

Those seeking to avail themselves of even a modest subset of such a wide array of options for playing an audio/visual program have often found themselves having to obtain multiple audio/visual devices (e.g., tuners, descramblers, disc media players, video recorders, web access devices, digital file players, televisions, visual displays without tuners, etc.). Each such audio/visual device often has a unique user interface, and more often than not, is accompanied by a separate handheld wireless remote control by which it is operated. Attempts have been made to grapple with the resulting plethora of remote controls that often accompany a multitude of audio/visual devices by providing so-called "universal remotes" enabling multiple audio/visual devices to be operated using a single remote control. However, a universal remote tends to go only so far in satisfying the desire of many users to simplify the coordination required in the operation of multiple audio/visual devices to perform the task of playing an audio/visual program.

Efforts have recently been made through cooperation among multiple purveyors of audio/visual devices to further ease the coordinated operation of multiple audio/visual devices through the adoption of standardized command codes and various approaches to coupling multiple audio/visual devices to enable the exchange of those standardized command codes among multiple audio/visual devices. An example of this effort is the CEC standardized command set created as part of the HDMI interface specification promulgated by HDMI Licensing, LLC of Sunnyvale, Calif. However, these efforts, even in conjunction with a universal remote, still only go so far in making the playing of an audio/visual program into a truly simple undertaking.

SUMMARY

A user interface for an audio/visual device incorporates one or both of a touch sensor having a touch surface on which is defined a racetrack surface having a ring shape and a display element on which is displayed a racetrack menu also having a ring shape, and where the user interface incorporates both, the ring shapes of the racetrack surface and the racetrack menu are structured to generally correspond such that the position of a marker on the racetrack menu is caused to correspond to the position at which a digit of a user's hand touches the racetrack surface.

In one aspect, an apparatus includes a display element capable of visually displaying a visual portion of an audio/visual program and a racetrack menu having a ring shape; a processing device; and a storage accessible to the processing device and storing a sequence of instructions. When the sequence of instructions is executed by the processing device, the processing device is caused to: cause the racetrack menu to be visually displayed on the display element such that the racetrack menu surrounds a first display area in which the visual portion of the audio/visual program may be visually displayed; cause a plurality of menu items to be visually displayed in the racetrack menu; cause a first marker to be visually displayed in the racetrack menu; receive an indication that a first manually-operable control is being operated to move the first marker; in response to the indication of the first manually-operable control being operated to move the first marker, move the first marker about the racetrack menu and constrain movement of the first marker to remain within the racetrack menu; receive an indication of the first manually-operable control being operated to select a menu item of the plurality of menu items that is in the vicinity of the first marker at a time subsequent to the first manually-operable control being operated to move the first marker about the racetrack; and in response to the indication of the first manually-operable control being operated to select the menu item that is in the vicinity of the first marker, cause the menu item to be selected, wherein causing the menu item to be selected comprises taking an action to cause the audio/visual program to be selected for playing.

Implementations may include, and are not limited to, one or more of the following features. The apparatus may further include a source interface operable to select a source from which to receive an audio/visual program, wherein the action taken to cause the audio/visual program to be selected for playing is selected from the group of actions consisting of: selecting the source interface to enable receipt of the audio/visual program from the source through the source interface; transmitting a command through the source interface to the source to select the audio/visual program from among a plurality of audio/visual programs available from the source; and transmitting a command through the source interface to the source to cause the source to provide the audio/visual program to the apparatus as part of playing the audio/visual program. Transmitting a command through the source interface to the source to select the audio/visual program from among the plurality of audio/visual programs available from the source may include causing the source to operate a radio frequency tuner to receive the audio/visual program, and/or causing the source to begin playing the audio/visual program from a storage medium accessible to the source.

The first manually-operable control may be a touch sensor having a touch-sensitive surface that is manually operable with a digit of a hand. Execution of the sequence of instructions by the processing device may further cause the processing device to cause the racetrack menu to be visually displayed in response to an indication of the digit touching the touch-sensitive surface followed by an indication of the digit moving about the touch-sensitive surface in a wiping motion at a time when the racetrack menu is not being visually displayed, and cause a command concerning playing the audio/visual program to be transmitted to a source of the audio/visual program in response to an indication of the digit touching the touch-sensitive surface followed by an indication of the digit ceasing to touch the touch-sensitive surface at a time when the racetrack menu is not being visually displayed. Execution of the sequence of instructions by the processing device may further cause the processing device to cause the racetrack menu to be visually displayed in response to an indication of the digit touching the touch-sensitive surface followed by an indication of the digit remaining in contact with the touch-sensitive surface for at least a predetermined period of time at a time when the racetrack menu is not being visually displayed, and cause a command concerning playing the audio/visual program to be transmitted to a source of the audio/visual program in response to an indication of the digit touching the touch-sensitive surface followed by an indication of the digit ceasing to touch the touch-sensitive surface at a time when the racetrack menu is not being visually displayed. Execution of the sequence of instructions by the processing device may further cause the processing device to cause a second marker to be visually displayed in the vicinity of the first marker in response to an indication of the digit touching the touch-sensitive surface, and move the second marker to a position relative to the first marker such that the position of the second marker relative to the first marker more precisely indicates the position where the digit is touching the touch-sensitive surface than does the position of the first marker within the racetrack menu in response to an indication of the digit moving about the touch-sensitive surface in a wiping motion.

Execution of the sequence of instructions by the processing device may further cause the processing device to move the first marker about the racetrack menu in a manner in which the first marker snaps between being in the vicinity of a first menu item of the plurality of menu items and being in the vicinity of a second menu item of the plurality of menu items, and the processing device may be further caused to operate an acoustic driver to acoustically output a sound at each instance of the first marker snapping between the vicinities of the first and second menu items. Execution of the sequence of instructions by the processing device may further cause the processing device to alter a dimension of the size of the first marker as the processing device is caused to move the first marker about the racetrack menu between the vicinity of a first menu item of the plurality of menu items and the vicinity of a second menu item of the plurality of menu items. The first marker may have the form of an arrow pointer pointing at a menu item of the plurality of menu items, a box surrounding a menu item of the plurality of menu items, or an alteration to the appearance of a menu item of the plurality of menu items that is distinct from the appearance of other menu items of the plurality of menu items. The racetrack menu may have a rectangular ring shape having four sides; and execution of the sequence of instructions by the processing device may further cause the processing device to receive an indication that the first manually-operable control is being operated, and cause a second marker to be visually displayed in the racetrack menu in the vicinity of one of the four sides of the rectangular ring shape of the racetrack menu to visually indicate which one of the four sides the first marker is currently located within.

Execution of the sequence of instructions by the processing device may further cause the processing device to cause the racetrack menu to be visually displayed on the display element in response to receiving any indication of any manual operation of the first manually-operable control, and cause the racetrack menu to cease to be visually displayed on the display element in response to a predetermined period of time having elapsed without any receipt of any indication of any manual operation of the first manually-operable control. Execution of the sequence of instructions by the processing device may further cause the processing device to: cause both the first display area and a second display area to be displayed on the display element in a manner in which both the first and second display areas are surrounded by the racetrack menu; cause a first menu item that is associated with a visual portion of an audio/visual program being played in the first display area to be located in a first portion of the racetrack menu located closer to the first display area than a second portion of the racetrack menu; and cause a second menu item that is associated with a visual portion of an audio/visual program being played in the second display area to be located in the second portion of the racetrack menu. The first display area may be positioned to overlie a portion of the second display area. The first display area and the second display area may be positioned adjacent to each other in a manner in which neither of the first and second display areas overlie the other.

In one aspect, a method includes visually displaying a racetrack menu having a ring shape on a display element that is capable of visually displaying both the racetrack menu and a visual portion of an audio/visual program such that the racetrack menu surrounds a first display area in which the visual portion of the audio/visual program may be visually displayed; visually displaying a plurality of menu items in the racetrack menu; visually displaying a first marker in the racetrack menu; receiving an indication that a first manually-operable control is being operated to move the first marker; in response to the indication of the first manually-operable control being operated to move the first marker, moving the first marker about the racetrack menu and constraining movement of the first marker to remain within the racetrack menu; receiving an indication of the first manually-operable control being operated to select a menu item of the plurality of menu items that is in the vicinity of the first marker at a time subsequent to the first manually-operable control being operated to move the first marker about the racetrack; and in response to the indication of the first manually-operable control being operated to select the menu item that is in the vicinity of the first marker, selecting the menu item, wherein selecting the menu item comprises taking an action to cause the audio/visual program to be selected for playing.

Implementations may include, and are not limited to, one or more of the following features. The method may further include visually displaying the racetrack menu in response to receiving an indication of a digit of a hand touching a touch-sensitive surface of the first manually-operable control followed by an indication of the digit moving about the touch-sensitive surface in a wiping motion at a time when the racetrack menu is not being visually displayed; and transmitting a command concerning playing the audio/visual program to a source of the audio/visual program in response to an indication of the digit touching the touch-sensitive surface followed by an indication of the digit ceasing to touch the touch-sensitive surface at a time when the racetrack menu is not being visually displayed. The method may further include visually displaying the racetrack menu in response to receiving an indication of a digit of a hand touching a touch-sensitive surface of the first manually-operable control followed by an indication of the digit remaining in contact with the touch-sensitive surface for at least a predetermined period of time at a time when the racetrack menu is not being visually displayed; and transmitting a command concerning playing the audio/visual program to a source of the audio/visual program in response to an indication of the digit touching the touch-sensitive surface followed by an indication of the digit ceasing to touch the touch-sensitive surface at a time when the racetrack menu is not being visually displayed. The method may further include visually displaying the racetrack menu on the display element in response to receiving any indication of any manual operation of the first manually-operable control; and ceasing to visually display the racetrack menu on the display element in response to a predetermined period of time having elapsed without any receipt of any indication of any manual operation of the first manually-operable control.

The action taken to cause the audio/visual program to be selected for playing is selected from the group of actions may include selecting a source interface to enable receipt of the audio/visual program from a source of the audio/visual program through the source interface; transmitting a command through the source interface to the source to select the audio/visual program from among a plurality of audio/visual programs available from the source; and transmitting a command through the source interface to the source to cause the source to provide the audio/visual program to the apparatus as part of playing the audio/visual program. Transmitting a command through the source interface to the source to select the audio/visual program from among the plurality of audio/visual programs available from the source may include causing the source to operate a radio frequency tuner to receive the audio/visual program and/or causing the source to begin playing the audio/visual program from a storage medium accessible to the source.

The method may further include moving the first marker about the racetrack menu in a manner in which the first marker snaps between being in the vicinity of a first menu item of the plurality of menu items and being in the vicinity of a second menu item of the plurality of menu items, and may further include operating an acoustic driver to acoustically output a sound at each instance of the first marker snapping between the vicinities of the first and second menu items. The racetrack menu may have a rectangular ring shape having four sides; and the method may further include receiving an indication that the first manually-operable control is being operated, and causing a second marker to be visually displayed in the racetrack menu in the vicinity of one side of the four sides of the rectangular ring shape of the racetrack menu to visually indicate which one of the four sides the first marker is currently located within.

The method may further include displaying both the first display area and a second display on the display element in a manner in which both the first and second display areas are surrounded by the racetrack menu; where a first menu item is associated with a visual portion of an audio/visual program being played in the first display area, displaying the first menu item in a first portion of the racetrack menu located closer to the first display area than a second portion of the racetrack menu; and where a second menu item is associated with a visual portion of an audio/visual program being played in the second display area, displaying the second menu item in the second portion of the racetrack menu. The method may further include positioning the first display area to overlie a portion of the second display area, or positioning the first display area and the second display area adjacent to each other in a manner in which neither of the first and second display areas overlie the other.

Other features and advantages of the invention will be apparent from the description and claims that follow.

DESCRIPTION OF THE DRAWINGS

FIG. 1 is a perspective view of an embodiment of a user interface.

FIG. 2 depicts correlations between movement of a digit on a racetrack sensor of the user interface of FIG. 1 and movement of a marker on a racetrack menu of the user interface of FIG. 1.

FIGS. 3a, 3b, 3c and 3d, together, depict possible variants of the user interface of FIG. 1 incorporating different forms and combinations of markers.

FIGS. 7a and 7b, together, depict additional possible details of the user interface of FIG. 1.

DETAILED DESCRIPTION

Figure 3A:
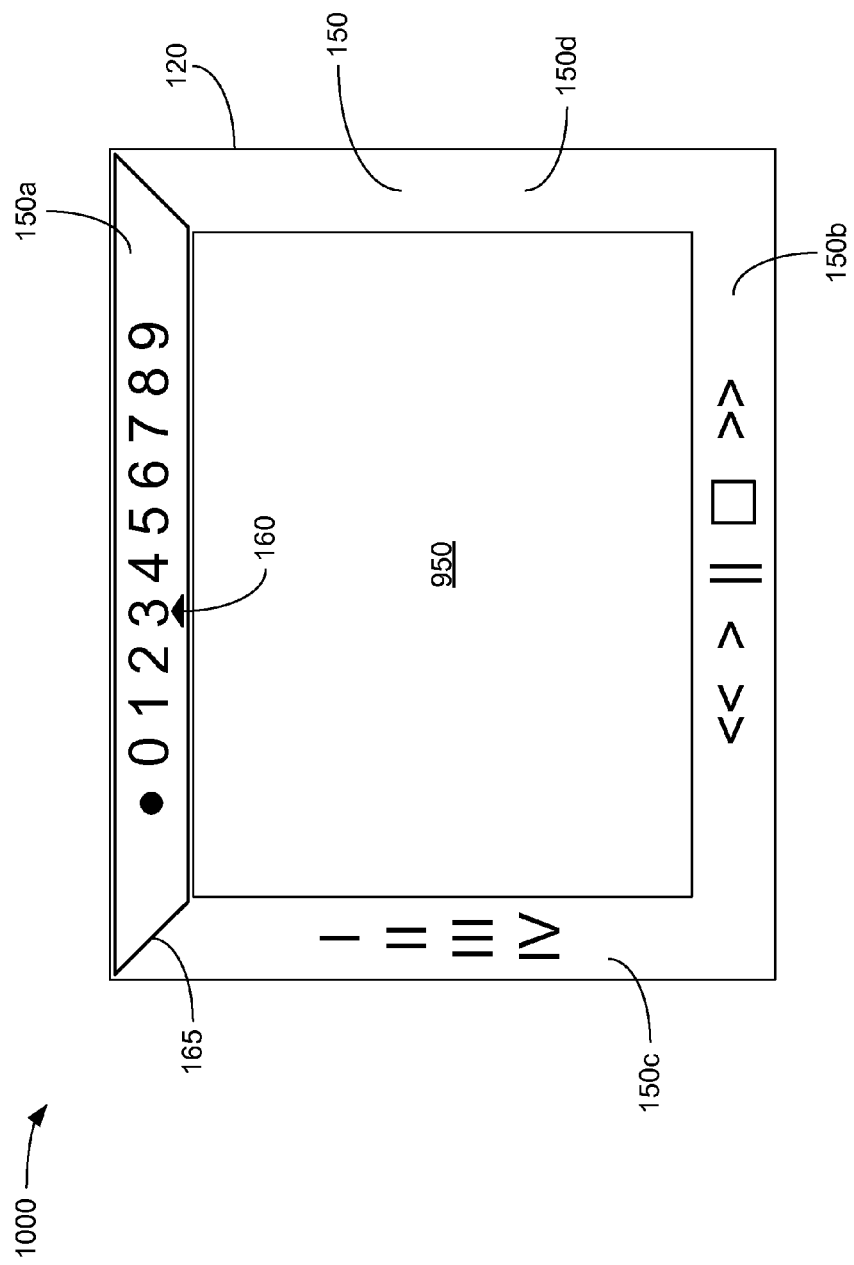

What is disclosed and what is claimed herein is intended to be applicable to a wide variety of audio/visual devices, i.e., devices that are structured to be employed by a user to play an audio/visual program. It should be noted that although various specific embodiments of audio/visual devices (e.g., televisions, set-top boxes and hand-held remotes) are presented with some degree of detail, such presentations of specific embodiments are intended to facilitate understanding through the use of examples, and should not be taken as limiting either the scope of disclosure or the scope of claim coverage.

It is intended that what is disclosed and what is claimed herein is applicable to audio/visual devices that employ a tuner and/or a network interface to receive an audio/visual program. It is intended that what is disclosed and what is claimed herein is applicable to audio/visual devices structured to cooperate with other devices to play an audio/visual program and/or to cause an audio/visual program to be played. It is intended that what is disclosed and what is claimed herein is applicable to audio/visual devices that are wirelessly connected to other devices, that are connected to other devices through electrically and/or optically conductive cabling, or that are not connected to any other device, at all. It is intended that what is disclosed and what is claimed herein is applicable to audio/visual devices having physical configurations structured to be either portable or not. Still other configurations of audio/visual devices to which what is disclosed and what is claimed herein are applicable will be apparent to those skilled in the art.

FIG. 1 depicts a user interface 1000 enabling a user's hand-eye coordination to be employed to more intuitively operate at least one audio/visual device to select and play an audio/visual program. The user interface 1000 incorporates a displayed "racetrack" menu 150 and a corresponding "racetrack" surface 250. As depicted, the user interface 1000 is implemented by an interoperable set of devices that include at least an audio/visual device 100 and a handheld remote control 200, and as will be explained in greater detail, may further include another audio/visual device 900. However, as will also be explained in greater detail, the user interface 1000 may be substantially fully implemented by a single audio/visual device, such as the audio/visual device 100.

The racetrack menu 150 is visually displayed on a display element 120 disposed on a casing 110 of the audio/visual device 100, and as depicted, the audio/visual device 100 is a flat panel display device such as a television, employing a flat panel form of the display element 120 such as a liquid crystal display (LCD) element or a plasma display element. Further, the audio/visual device 100 may further incorporate acoustic drivers 130 to acoustically output sound. However, as those skilled in the art will readily recognize, the racetrack menu 150 may be displayed by any of a variety of types, configurations and sizes of audio/visual device, whether portable or stationary, including and not limited to, a projector or a handheld device.

The racetrack surface 250 is defined on a touch-sensitive surface 225 of a touch sensor 220 disposed on a casing 210 of the handheld remote control 200, and as depicted, the touch-sensitive surface 225 has a rectangular ring shape that physically defines the shape and position of the racetrack surface 250 such that the racetrack surface 250 encompasses substantially all of the touch-sensitive surface of the touch sensor 220. However, as those skilled in the art will readily recognize, the touch sensor 220 may be incorporated into any of a wide variety of devices, whether portable or stationary, including and not limited to, a wall-mounted control panel or a keyboard. Further, it is also envisioned that the touch sensor 220 may have a variant of the touch-sensitive surface 225 (see FIG. 2) that is of a shape other than a ring shape with the racetrack surface 250 defined on that variant of the touch-sensitive surface 225 in another way such that the racetrack surface 250 encompasses only a subset of that variant of the touch-sensitive surface 225 of the touch sensor 220. Further, the touch sensor 220 may be based on any of a variety of technologies.

As depicted, both the racetrack menu 150 and the racetrack surface 250 have a ring shape that is a generally rectangular ring shape with corresponding sets of four sides. More specifically, the four sides 150a, 150b, 150c and 150d of the racetrack menu 150 are arranged to correspond to the four sides 250a, 250b, 250c and 250d of the racetrack surface 250. This four-sided nature of both of the racetrack menu 150 and the racetrack surface 250 are meant to accommodate the rectilinear nature of the vast majority of display elements currently found in audio/visual devices and the rectilinear nature of the visual portion of the vast majority of currently existing audio/visual programs that have a visual portion. However, it is important to note that although the racetrack menu 150 and the racetrack surface 250 are depicted and discussed herein as having a rectangular ring shape, other embodiments are possible in which the ring shape adopted by the racetrack surface 250 has a circular ring shape, an oval ring shape, a hexagonal ring shape or still other geometric variants of a ring shape. Further, where the racetrack menu 150 and/or the racetrack surface 250 have a ring shape that is other than a rectangular ring shape, one or both of the display element 120 and the touch sensor 220 may have a shape other than the rectangular shapes depicted herein.

As will be explained in greater detail, the four sides 150a-d of the racetrack menu 150 surround or overlie the edges of a display area 950 in which the visual portion of an audio/visual program selected via the user interface 1000 may be played. It is this positioning of the racetrack menu 150 about the periphery of the display element 120 and the display area 950 (whether surrounding or overlying the periphery of the display area 950) that supplies the impetus for both the racetrack menu 150 and the racetrack surface 250 having a ring shape that is generally a rectangular ring shape, rather than a ring shape of some other geometry. Where a selected audio/visual program does not have a visual portion (e.g., the audio/visual program is an audio recording having only an audio portion), the display area 950 may remain blank (e.g., display only a black or blue background color) or display status information concerning the playing of the selected audio/visual program as the selected audio/visual program is played, perhaps with the audio portion being acoustically output by the acoustic drivers 130. As depicted, the four sides 150a-d of the racetrack menu 150 are displayed by the display element 120 at the edges of the display element 120. However, it is also envisioned that the four sides 150a-d of the racetrack menu 150 may be positioned about the edges of a "window" of a graphical user interface of the type commonly employed in the operation of typical computer systems, perhaps where the audio/visual device 100 is a computer system on which audio/visual programs are selected and played through the user interface 1000.

As shown in FIG. 2, at various positions along one or more of the four sides 150a-d of the racetrack menu 150 are menu items 155 that may be selected by a user of the user interface 1000. The menu items 155 may include alphanumeric characters (such as those depicted as positioned along the side 150a) that may be selected to specify a channel or a website from which to select and/or receive an audio/visual program, symbols (such as those depicted as positioned along the side 150b) representing commands to control the operation of an audio/visual device capable of playing an audio/visual program (e.g., "play" and "stop" commands for a video cassette recorder, a disc media player, or solid state digital file player, etc.), and indicators of inputs (such as those depicted as positioned along the side 150c) to an audio/visual device that may be selected and through which an audio/visual program may be selected and/or received. Although the various menu items 155 positioned along the racetrack menu 150 could conceivably serve any of a wide variety of purposes, it is envisioned that much of the functionality of the menu items 155 will be related to enabling a user to select an audio/visual program for playing, and/or to actually play an audio/visual program.

To operate the user interface 1000, a user places the tip of a digit of one of their hands (i.e., the tip of a thumb or finger) on a portion of the racetrack surface 250 defined on the touch-sensitive surface 225 of the touch sensor 220, and a marker 160 is displayed on a portion of the racetrack menu 150 that has a position on the racetrack menu 150 that corresponds to the position 260 on the racetrack surface 250 at which the tip of their digit is in contact with the touch-sensitive surface 225 of the touch sensor 250. FIG. 2 also depicts how the marker 160 moves about and is constrained to moving about the racetrack menu 150 to maintain a correspondence between its location on the racetrack menu 150 and the position 260 of the digit on the racetrack surface 250 as the user moves that digit about the racetrack surface 250. In some embodiments, the marker 160 may move about the racetrack menu 150 in a manner in which the marker 160 "snaps" from being centered about one menu item 155 to an adjacent menu item 155 as the marker 160 is moved about a portion of the racetrack menu 150 having adjacent ones of the menu items 155. Further, such "snapping" of the marker 160 between adjacent ones of the menu items 155 may be accompanied by the concurrent acoustic output of some form of sound (e.g., a "click" or "beep" sound that accompanies each "snap" of the marker 160) to provide further feedback to a user of the marker 160 moving from one such menu item 155 to another.

When the marker 160 is positioned over a menu item 155 that the user wishes to select, the user selects that menu item 155 by pressing whichever one of their digits that is already in contact with the racetrack surface 250 with greater pressure than was used in simply placing that digit in contact with the racetrack surface 250. In some embodiments, the touch sensor 220, itself, is capable of distinguishing different degrees of pressure with which the digit is put into contact with the touch-sensitive surface 225 of the touch sensor 220 on which the racetrack surface 250 is defined in order to distinguish an instance in which the user is pressing harder with that digit to select one of the menu items 155. In other embodiments, the touch sensor 220 is able to function in a manner not unlike a mechanically depressible button in which the additional pressure applied through that digit by the user causes the touch sensor 220 to be pressed inward towards the casing 210 as part of selecting a menu item. This may be accomplished by overlying one or more buttons disposed within the casing 210 with the touch sensor 220 so that such buttons are depressed by the touch sensor 220 as the touch sensor 220 is itself depressed towards the casing 210. Where the touch sensor 220 is able to be pressed inward towards the casing 210, such inward movement may be accompanied by a "click" sound that may be heard by the user and/or a tactile "snap" sensation that can be sensed by the user through their digit to give the user some degree of positive feedback that they've successfully selected one of the menu items 155. Regardless of whether the touch sensor 220 is able to be pressed inward towards the casing 210, or not, a "click" or other sound accompanying the user's use of increased pressure on the racetrack surface 250 to select one of the menu items 155 may be acoustically output through an acoustic driver (not shown) incorporated into the remote control 200 and/or through the acoustic drivers 130 of the audio/visual device 100.

Figure 3B:
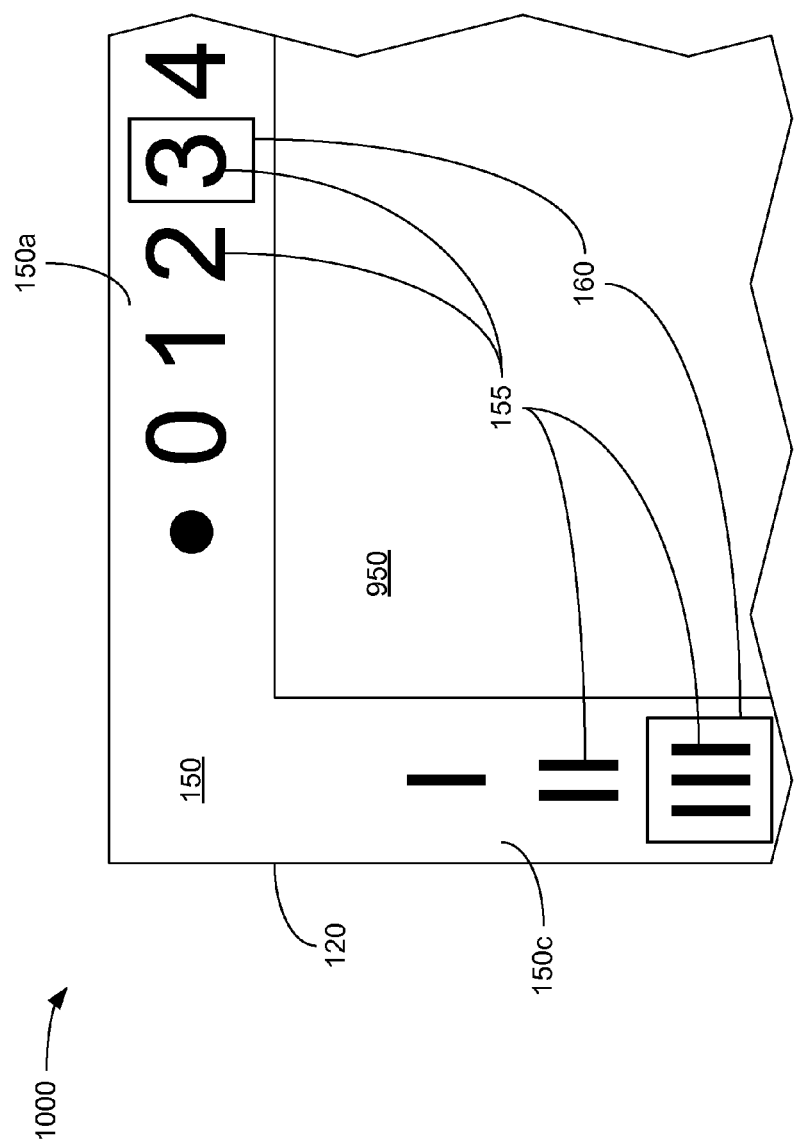
Figure 3C:
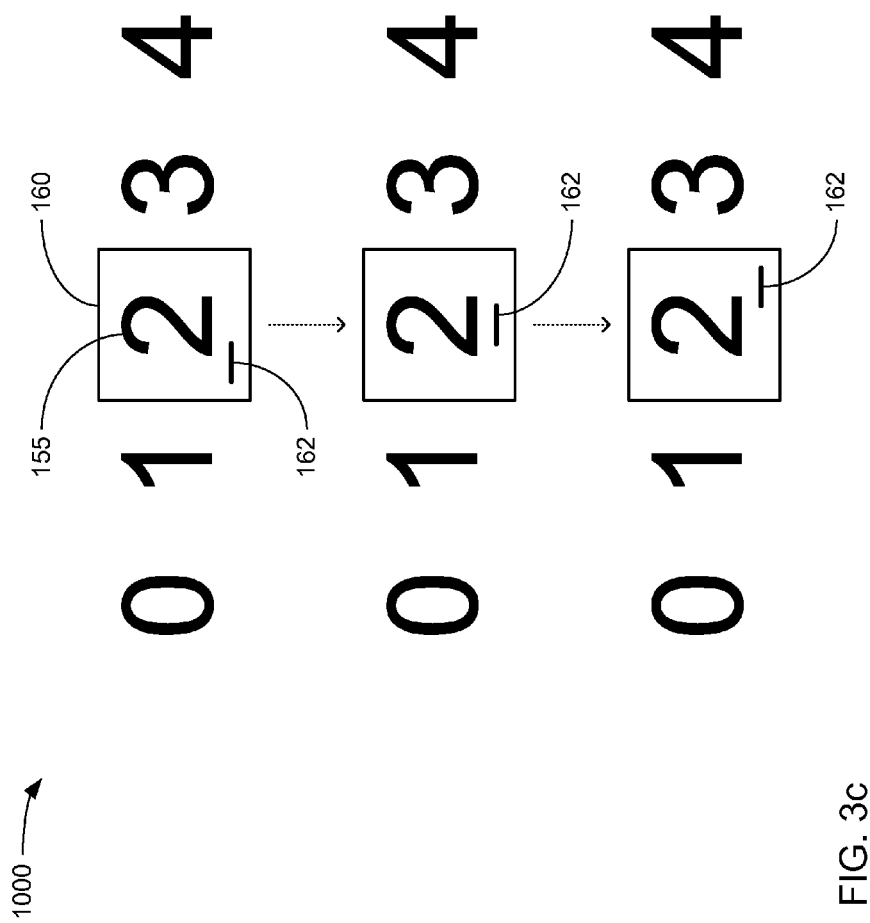

FIGS. 3a, 3b and 3c depict other variations of forms of marker and combinations of markers. As will be made clear, different forms of marker and combinations of multiple markers may be used to enhance the rapidity with which the eyes of a user of the user interface 1000 is drawn to a specific location on the racetrack menu 150, and to aid the hand-eye coordination of that user.

Although the marker 160 was depicted in FIG. 2 as taking the form of a box-shaped graphical element sized to surround one of the menu items 155 at a time when positioned in the vicinity of one or more of the menu items 155, FIG. 3a depicts another variant of the marker 160 having the form of a triangular pointer. Still other possible graphical representations of the marker 160 will occur to those skilled in the art, such as forms of the marker 160 having other geometric shapes (e.g., a dot, a circle, an arrow, etc.) or other ways of being positioned in the vicinity of a given one of the menu items 155 (e.g., overlying, surrounding, pointing to, touching, etc., one of the menu items 155). Still further, instead of the marker being a graphical element that is separate and distinct from any of the menu items 155, the marker 160 may instead be a modified form of a given one of the menu items 155, such as a change in a color of a menu item, an enlargement of a menu item in comparison to others, or some form of recurring animation or movement imparted to a menu item. In other words, the position of the marker 160 (and by extension, the position 260 of the tip of a digit on the racetrack surface 250) may be indicated by one of the menu items 155 changing color, changing font, becoming larger, becoming brighter, or being visually altered in comparison to the others of the menu items 155 in any of a number of ways to draw a user's eyes to it.

FIG. 3a also depicts an optional additional marker 165 that follows the location of the marker 160 and provides a visual "highlight" of which one of the four sides 150a-d the marker 160 is currently positioned within as a visual aid to enable a user's eyes to be more quickly directed to that one of the four sides 150a-d when looking at the racetrack menu 150. Though not specifically depicted, in other embodiments, the additional marker 165 may be implemented as a highlighting, change in color, change in background color, change in font, enlargement or other visual alteration made to all of the menu items 155 that are positioned in that one of the four sides 150a-d.

FIG. 3b depicts the manner in which the marker 160 may be dynamically resized as it is moved about the racetrack menu 150, especially in embodiments where the marker 160 is of a form that in some way overlaps or surrounds one of the menu items 155 at a time in order to take into account the different sizes of different ones of the menu items 155. More specifically, and as depicted in FIG. 3b, the numeral "3" has visibly smaller dimensions (i.e., occupies less space in the racetrack menu 150) than does the numeral "III" that is also present on the same racetrack menu 150. Thus, when the depicted form of the marker 160 (i.e., the "box" form of the marker 160 that has been discussed at length) is positioned on one or the other of these two particular ones of the menu items 155, the marker 160 is resized to be larger or smaller as needed to take into account the different sizes of these two particular ones of the menu items 155.

FIG. 3c also depicts an optional additional marker 162 that follows the location of the marker 160 and provides a more precise visual indication than does the marker 160 of the position 260 of the tip of a user's finger along a corresponding portion of the racetrack surface 250. As depicted, the marker 162 takes the form of what might be called a "dash" positioned along one of the edges of the box form of the marker 160. However, it should be noted that the marker 162 may take any of a variety of forms (e.g., a dot, a circle, an arrow, etc.). The provision of the marker 162 may be deemed desirable in embodiments where the marker 160 moves in the manner previously described in which the marker 160 "snaps" between adjacent ones of the menu items 155 such that the marker 160 does not, itself, provide as precise an indication of the position 260 of the tip of the user's digit. More specifically, FIG. 3c depicts a succession of views of a portion of the racetrack menu 150 on which menu items 155 taking the form of the numerals "1" through "5" are positioned. As can be seen in this depicted succession, the marker 162 provides a more precise indication of the movement of the position 260 of the tip of the user's digit along a portion of the racetrack surface 250 from left to right than does the marker 160 which remains on the one of the menu items 155 having the form of the numeral "2" on this portion of the racetrack menu 150. Such a higher precision indication of the position 260 of the tip of the user's digit may aid the user in improving their hand-eye coordination in operating the user interface 1000. Such a higher precision indication of the position 260 may also provide a user with some degree of reassurance that the user interface 1000 is responding to their actions (or more specifically, whatever processing device is incorporated into the user interface 1000 is responding to their actions) by seeing that the exact position 260 of the tip of their digit is being successfully detected.

FIG. 3d depicts yet another alternate variation of the marker 160 in a variant of the user interface 1000 in which the racetrack menu 150 is divided into multiple segments, with each such segment serving as a background to one of the menu items 155. As depicted, the marker 160 is implemented as both a change in the color and/or brightness of one of those segments of the racetrack menu 150 and an enlarging of the graphical element representing the one of the menu items 155 (specifically, the numeral "3") positioned within that segment. As so depicted, the marker 160 might be said to have a form that is a variant of the earlier-depicted box, but a box that is made visible by having a color and/or brightness that differs from the rest of the racetrack menu 150, rather than a box that is made visible by a border or outline. FIG. 3d also depicts this alternate variation of the marker 160 being used in combination with the earlier-described additional marker 162 that provides a more precise indication of the position 260 of the tip of a user's digit along a portion of the racetrack surface 250.

FIG. 3d also depicts how this variant of the marker 160 is resized to accommodate the different sizes of the different ones of the menu items 155, although this resizing now corresponds to the differing dimensions of different ones of the segments into which the racetrack menu 150 is divided. In some variants, each of the segments may be individually sized to fit the visual size and shape of its corresponding one of the menu items 155, as depicted in FIG. 3d. Thus, since the numeral "3" of one of the menu items 155 is smaller in at least one dimension than the numeral "III" of another one of the menu items 155 (even with the numeral "3" being enlarged in font size), the segment of the racetrack menu 150 in which the numeral "3" is positioned is smaller than the segment in which the numeral "III" is positioned. However, in other variants, the segments filling at least one of the four sides 150a-d may all be sized based on the quantity of the menu items 155 positioned in that one of the four sides so as to divide that one of the four sides 150a-d into equal-sized segments. Where the ones of the menu items 155 along that one of the four sides 150a-d may change in response to a selection of an input or for other reasons, the size of the segments in that one of the four sides 150a-d may change in response to a change in quantity of the menu items 155 positioned in that one of the four sides 150a-d. Thus, for example, a reduction in the quantity of menu items 155 in that one of the four sides 150a-d results in each of its segments becoming larger in at least one dimension, and an increase in the quantity of menu items 155 results in that one of the four sides 150a-d results in each of its segments becoming smaller.

Figure 4:
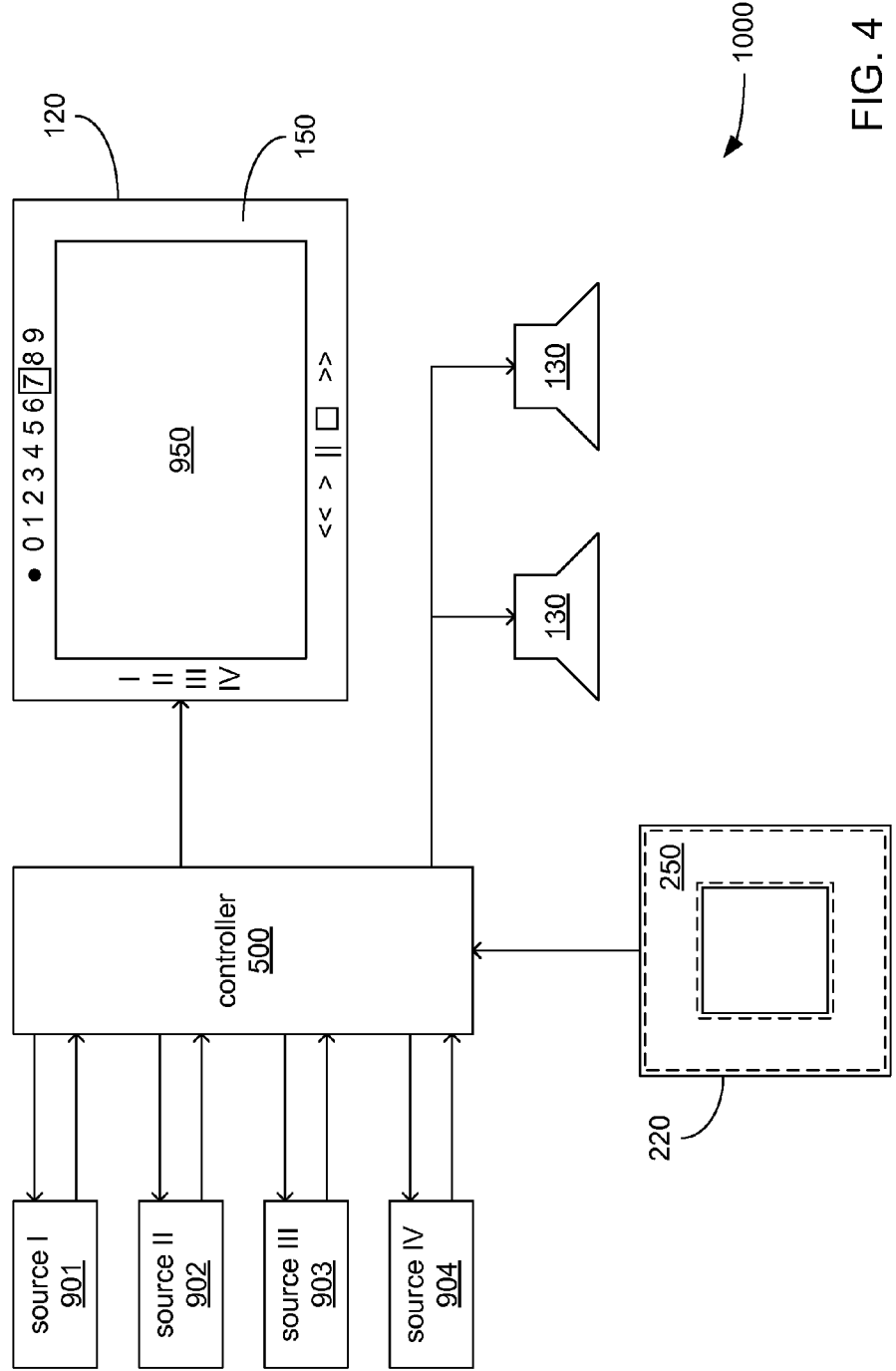
FIG. 4 is a block diagram of a possible architecture of the user interface of FIG. 1.

FIG. 4 is a block diagram of a possible architecture of the user interface 1000 by which a controller 500 receives input through a user's use of at least the racetrack surface 250 defined on at least a portion of a touch-sensitive surface 225 of the touch sensor 220 to which the controller 500 is coupled, and provides at least the racetrack menu 150 as a visual output to the user through at least the display element 120 to which the controller 500 is also coupled. In various possible embodiments, the controller 500 may be incorporated directly into the audio/visual device 100, or into another audio/visual device 900 coupled to the audio/visual device 100 and shown in dotted lines in FIG. 1. As also depicted in FIG. 1, the remote control 200 communicates wirelessly through the emission of radio frequency, infrared or other wireless emissions to whichever one of the audio/visual devices 100 and 900 incorporates the controller 500. However, as those skilled in the art will readily recognize, the remote control 200 may communicate through an electrically and/or optically conductive cable (not shown) in other possible embodiments. Alternatively and/or additionally, the remote control 200 may communicate through a combination of wireless and cable-based (optical or electrical) connections forming a network between the remote control 200 and the controller 500.

Figure 5:
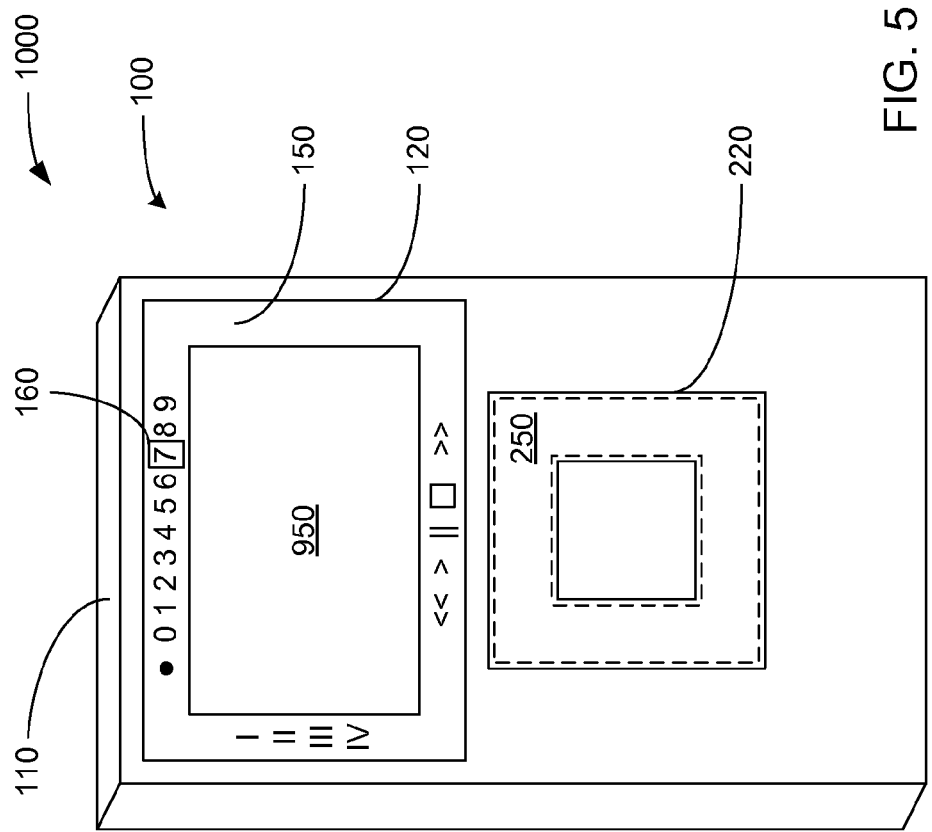
FIG. 5 is a perspective view of another embodiment of the user interface of FIG. 1 combining more of the features of the user interface into a single device.

Still other embodiments may incorporate the touch sensor 220 directly on a user accessible portion of one or both of the audio/visual devices 100 and 900, either in addition to or as an alternative to providing the touch sensor 220 on the remote control 200. Indeed, FIG. 5 depicts an alternate variant of the audio/visual device 100 having more of a portable configuration incorporating both the display element 120 displaying the racetrack menu 150 and the touch sensor 220 on a touch-sensitive surface 225 on which the racetrack surface 250 is defined. This alternative variant of the audio/visual device 100 may also incorporate the controller 500, such that much (if not substantially all) of the user interface 1000 is implemented solely by the audio/visual device 100.

Returning to FIG. 4, regardless of which audio/visual device incorporates the controller 500, the controller 500 incorporates multiple interfaces in the form of one or more connectors and/or one or more wireless transceivers by which the controller 500 is able to be coupled to one or more sources 901, 902, 903 and/or 904. Any such connectors may be disposed on the casing of whatever audio/visual device the controller 500 is incorporated into (e.g., the casing 110 of the audio/visual device 100 or a casing of the audio/visual device 900). In being so coupled, the controller 500 is able to transmit commands to one or more of the sources 901-904 to access and select audio/visual programs, and is able to receive audio/visual programs therefrom. Each of the sources 901-904 may be any of a variety of types of audio/visual device, including and not limited to, RF tuners (e.g., cable television or satellite dish tuners), disc media recorders and/or players, tape media recorders and/or players, solid-state or disk-based digital file players (e.g., a MP3 file player), Internet access devices to access streaming data of audio/visual programs, or docking cradles for portable audio/visual devices (e.g., a digital camera). Further, in some embodiments, one or more of the sources 901-904 may be incorporated into the same audio/visual device into which the controller 500 is incorporated (e.g., a built-in disc media player or built-in radio frequency tuner).

In embodiments where one of the sources 901-904 is not incorporated into the same audio/visual device as the controller 500, and where that one of the sources 901-904 is coupled to the controller 500 via an interface of the controller 500 employing a connector, any of a variety of types of electrical and/or optical signaling conveyed via electrically and/or optically conductive cabling may be employed. Preferably, a single cable is employed both in relaying commands from the controller 500 to that one of the sources 901-904 and in relaying audio/visual programs to the controller 500. However, combinations of cabling in which different cables separately perform these functions are also possible. Some of the possible forms of cabling able to relay both commands and audio/visual programs may conform to one or more industry standards, including and not limited to, Syndicat des Constructeurs d'Appareils Radiorecepteurs et Televiseurs (SCART) promulgated in the U.S. by the Electronic Industries Alliance (EIA) of Arlington, Va.; Ethernet (IEEE-802.3) or IEEE-1394 promulgated by the Institute of Electrical and Electronics Engineers (IEEE) of Washington, D.C.; Universal Serial Bus (USB) promulgated by the USB Implementers Forum, Inc. of Portland, Oreg.; Digital Visual Interface (DVI) promulgated by the Digital Display Working Group (DDWG) of Vancouver, Wash.; High-Definition Multimedia Interface (HDMI) promulgated by HDMI Licensing, LLC of Sunnyvale, Calif.; or DisplayPort promulgated by the Video Electronics Standards Association (VESA) of Milpitas, Calif. Other possible forms of cabling able to relay only one or the other of commands and audio/visual programs may conform to one or more industry standards, including and not limited to, RS-422 or RS-232-C promulgated by the EIA; Video Graphics Array (VGA) maintained by VESA; RC-5720C (more commonly called "Toslink") maintained by the Japan Electronics and Information Technology Industries Association (JEITA) of Tokyo, Japan; the widely known and used Separate Video (S-Video); or S-Link maintained by Sony Corporation of Tokyo, Japan.

In other embodiments where one of the sources 901-904 is not incorporated into the same audio/visual device as the controller 500, and where that one of the sources 901-904 is coupled to the controller 500 via a wireless transceiver, any of a variety of types of infrared, radio frequency or other wireless signaling may be employed. Preferably, a single wireless point-to-point coupling is employed both in relaying commands from the controller 500 to that one of the sources 901-904 and in relaying audio/visual programs to the controller 500. However, combinations of separate wireless couplings in which these functions are separately performed are also possible. Some of the possible forms of wireless signaling able to relay both commands and audio/visual programs may conform to one or more industry standards, including and not limited to, IEEE 802.11a, 802.11b or 802.11g promulgated by the IEEE; Bluetooth promulgated by the Bluetooth Special Interest Group of Bellevue, Wash.; or ZigBee promulgated by the ZigBee Alliance of San Ramon, Calif.

In still other embodiments where one of the sources 901-904 is not incorporated into the same audio/visual device as the controller 500, a combination of cabling-based and wireless couplings may be used. An example of such a combination may be the use of a cabling-based coupling to enable the controller 500 to receive an audio/visual program from that one of the sources 901-904, while an infrared transmitter coupled to the controller 500 may be positioned at or near the one of the sources 901-904 to wirelessly transmit commands via infrared to that one of the sources 901-904. Still further, although FIG. 4 depicts each of the sources 901-904 as being directly coupled to the controller 500 in a point-to-point manner, those skilled in the art will readily recognize that one or more of the sources 901-904 may be coupled to the controller 500 indirectly through one or more of the others of the sources 901-904, or through a network formed among the sources 901-904 (and possibly incorporating routers, bridges and other relaying devices that will be familiar to those skilled in the art) with multiple cabling-based and/or wireless couplings.

Some of the above-listed industry standards include specifications of commands that may be transmitted between audio/visual devices to control access to and/or control the playing of audio/visual programs, including most notably, SCART, IEEE-1394, USB, HDMI, and Bluetooth. Where such an industry standard for coupling the controller 500 to one or more of the sources 901-904 is employed, the controller 500 may limit the commands transmitted to one or more of the sources 901-904 to the commands specified by that industry standard and map one or more of those commands to corresponding ones of the menu items 155 such that a user is able to cause the controller 500 to send those commands to one or more of the sources 901-904 by selecting those corresponding ones of the menu items 155. However, where the benefit of such a standardized command set is unavailable, the controller 500 may employ any of a wide variety of approaches to identify one or more of the sources 901-904 to an extent necessary to "learn" what commands are appropriate to transmit and the manner in which they must be transmitted.

A user of the user interface 1000 may select one of the sources 901-904 as part of selecting an audio/visual program for being played by employing the racetrack surface 250 and the marker 160 to select one or more of the menu items 155 shown on the racetrack menu 150, such as the "I" through "IV" menu items 155 depicted as displayed by the controller 500 on the side 150c of the racetrack menu 150. Those menu items 155 depicted on the side 150c correspond to the sources 901 through 904, which are depicted as bearing the labels "source I" through "source IV" in FIG. 4. The controller 500 receives input from the touch sensor 220 indicating the contact of the user's digit with a portion of the racetrack surface 250, indicating movement of the position 260 of contact of the digit about the racetrack surface 250, and indicating the application of greater pressure by the user through that digit against the touch sensor 220 at the position 260 (wherever the position 260 is at that moment) when selecting one of the menu items 155. The selection of one of the sources 901-904 by the user causes the controller 500 to switch to receiving audio/visual programs from that one of the sources 901-904, and to be ready to display any visual portion in the display area 950 and acoustically output any audio portion through the acoustic drivers 130 (or whatever other acoustic drivers may be present and employed for playing audio/visual programs).

The selection of one of the sources 901-904 may further cause the controller 500 to alter the quantity and types of menu items 155 displayed on one or more of the sides 150a-d of the racetrack menu 150 such that the displayed menu items 155 more closely correspond to the functions supported by whichever one of the sources 901-904 that has been selected. This changing display of at least a subset of the menu items 155 enables the user to operate at least some functions of a selected one of the sources 901-904 by selecting one or more of the menu items 155 to thereby cause the controller 500 to transmit one or more commands corresponding to those menu items to the selected one of the sources 901-904. By way of example, where the one of the sources 901-904 with the ability to record an audio/visual program was previously selected, the racetrack menu 150 may include one or more menu items 155 that could be selected to cause the controller 500 to transmit a command to that previously selected one of the sources 901-904 to cause it to start recording an audio/visual program. However, if the user then selects another one of the sources 901-904 that does not have the ability to record an audio/visual program, then the controller 500 would alter the menu items 155 displayed on the racetrack menu 150 to remove one or more menu items associated with recording an audio/visual program. In this way, at least a subset of the menu items 155 displayed on the racetrack menu 150 are "modal" in nature, insofar as at least that subset changes with the selection of different ones of the sources 901-904.

The coupling and/or uncoupling of one or more of the sources 901-904 to and/or from whatever audio/visual device into which the controller 500 is incorporated may also cause the controller 500 to alter the quantity and/or types of menu items 155 that are displayed in another example of at least a subset of the menu items 155 being modal in nature. By way of example, the uncoupling of one of the sources 901-904 where that one of the sources 901-904 had been coupled through cabling may cause the controller 500 to remove the one of the menu items 155 by which that now uncoupled one of the sources 901-904 could be selected. Alternatively and/or additionally, where that uncoupled one of the sources 901-904 was already selected at the time of such uncoupling such that a subset of the menu items 155 is displayed that is meant to correspond to the functions able to be performed by that now uncoupled one of the sources 901-904, the controller 500 may respond to such an uncoupling by autonomously selecting one of the other of the sources 901-904 and altering the subset of the menu items 155 to correspond to the functions able to be performed by that newly selected one of the sources 901-904. In contrast, and by way of another example, the uncoupling of one of the sources 901-904 where that one of the sources 901-904 had been wirelessly coupled may or may not cause the controller 500 to remove the one of the menu items 155 by which that now uncoupled one of the sources 901-904 could be selected. If there is a mechanism provided in the chosen form of wireless communications used in the coupling that indicates that the uncoupling is due simply to that one of the sources 901-904 entering into a low-power or "sleep" mode, then it may be that no change is made by the controller 500 to the menu items 155 that are displayed, especially if the form of wireless communications used allows the controller 500 to signal that one of the sources 901-904 to "wake up" in response to the user selecting one of the menu items 155 that is associated with it. However, if no such mechanism to indicate the circumstances of an uncoupling are available, then the uncoupling may well result in an alteration or removal of at least some of the menu items 155 displayed on the racetrack menu 150. Where a previously uncoupled one of the sources 901-904 is subsequently coupled, once again, regardless of the type of coupling, the controller 500 may be caused to automatically select that now coupled one of the sources 901-904. This may be done based on an assumption that the user has coupled that source to whatever audio/visual device into which the controller 500 is incorporated with the intention of immediately playing an audio/visual program from it.

While at least some of the menu items 155 may be modal in nature such that they are apt to change depending on the selection and/or condition of one or more of the sources 901-904, others of the menu items 155 may not be modal in nature such that they are always displayed whenever the racetrack menu 150 is displayed. More specifically, where one or more of the sources 901-904 are incorporated into the same audio/visual device as the controller 500, the ones of the menu items 155 associated with those sources may remain displayed in the racetrack menu 150, regardless of the occurrences of many possible events that may cause other menu items 155 having a modal nature to be displayed, to not be displayed, or to be displayed in some altered form. By way of example, where a radio frequency tuner is incorporated into the same audio/visual device into which the controller 500 is incorporated, then a subset of the menu items 155 associated with selecting a radio frequency channel (e.g., the decimal point and numerals "0" through "9" depicted as displayed within the side 150*a*) may be a subset of the menu items 155 that is always displayed in the racetrack menu 150. It may be that the selection of any menu item of such a subset of the menu items 155 may cause the controller 500 to automatically switch the selection of a source of audio/visual programs to the source associated with those menu items 155. Thus, in the example where an audio/visual device incorporates a radio frequency tuner and menu items 155 associated with selecting a radio frequency channel are always displayed, the selection of any one of those menu items would cause the controller 500 to automatically switch to that radio frequency tuner as the source from which to receive an audio/visual program if that tuner were not already selected as the source. By way of another example, one or more of the menu items 155 associated with selecting a source of audio/visual programs (e.g., the roman numerals "I" through "IV" depicted as displayed within the side 150*c*) may be menu items that are always displayed in the racetrack menu 150.

Regardless of what source is selected or how the source is selected, if an audio/visual program received by the controller 500 from that source has a visual portion, then the controller 500 causes that visual portion to be displayed in the display area 950. As has so far been depicted and described, the racetrack menu 150 has a rectilinear configuration with the four sides 150*a-d* that are configured to surround or overlie edges of the display area 950. However, in some embodiments, it may be that the racetrack menu 150 is not always displayed such that what is shown on the display element 120 of the audio/visual device 100 could be either the display area 950 surrounded by the racetrack menu 150, or the display area 950 expanded to fill the area otherwise occupied by the racetrack menu 150.

Figure 6:
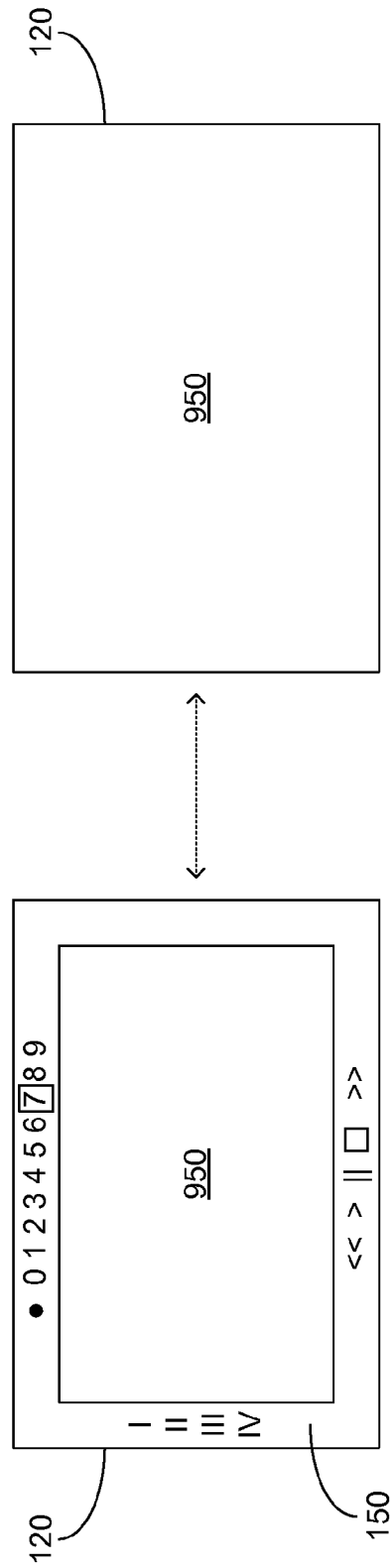
FIG. 6 depicts a possibility of switching between displaying and not displaying the racetrack menu of the user interface of FIG. 1.

As depicted in FIG. 6, what is shown on the display element 120 could toggle between these two possibilities, and this toggling could occur in response to observed activity and/or a lack of observed activity in the operation of at least the racetrack surface 250. More specifically, on occasions where no indication of contact by a user's digit on the racetrack surface 250 has been received by the controller 500 for at least a predetermined period of time, the controller 500 may provide the display element 120 with an image that includes substantially nothing else but the display area 950 such that a visual portion of an audio visual program is substantially the only thing shown on the display element 120. However, once the controller 500 has received an indication of activity such as the tip of a digit making contact with racetrack surface 250, the controller 500 then provides the display element 120 with an image that includes a combination of the display area 950 and the racetrack menu 150.

In some embodiments, at a time when both the display area 950 and the racetrack menu 150 are displayed, the controller 500 reduces the size of the display area 950 to make room around the edges of the display area 950 for the display of the racetrack menu 150 on the display element 120, and in so doing, may rescale the visual portion (if there is one) of whatever audio/visual program may be playing at that time. In other embodiments, the display area 950 is not resized, and instead, the racetrack menu 150 is displayed in a manner in which the racetrack menu 150 overlies edge portions of the display area 950 such that edge portions of any visual portion of an audio/visual program are no longer visible. However, in those embodiments in which the racetrack menu overlies edge portions of the display area 950, the racetrack menu 150 may be displayed in a manner in which at least some portions of the racetrack menu have a somewhat "transparent" quality in which the overlain edge portions of any visual portion of an audio/visual program can still be seen by the user "looking through" the racetrack menu 150. As will be familiar to those skilled in the art, this "transparent" quality may be achieved through any of a number of possible approaches to combining the pixels of the image of the racetrack menu 150 with pixels of the overlain portion of any visual portion of an audio/visual program (e.g., by averaging pixel color values, alternately interspersing pixels, or bit-wise binary combining of pixels with a pixel mask).

Along with combining the visual display of the display area 950 and the racetrack menu 150, the controller 500 may also combine audio associated with operation of the user interface 1000 with an audio portion (if present) of an audio/visual program being played. More specifically, "click" sounds associated with the user pressing the racetrack surface 250 defined on a surface of the touch sensor 220 with greater pressure and/or with the "snapping" of the marker 160 between adjacent ones of the menu items 155 may be combined with whatever audio portion is acoustically output as part of the playing of an audio/visual program.

In some embodiments, at a time when the racetrack menu 150 is not displayed (e.g., at a time when only the display area 950 is displayed), the controller 500 may do more than simply cause the racetrack menu 150 to be displayed in response to a user touching a portion of the racetrack sensor 250. More specifically, in addition to causing the racetrack menu 150 to be displayed, the controller 500 may take particular actions in response to particular ones of the sides 250a-d of the racetrack surface 250 being touched by a user at a time when the racetrack menu 150 is not being displayed. By way of example, at a time when the racetrack menu 150 is not being displayed, the detection of a touch to the side 250d may cause a command to be sent to one of the sources 901-904 to provide an on-screen guide concerning audio/visual programs able to be provided by that source, where such a guide would be displayed in the display area 950, with edges of the display area 950 being either surrounded or overlain by the racetrack menu 150 as has been previously described.

In a variation of such embodiments, it may be that causing the racetrack menu 150 to be displayed requires both a touch and some minimum degree of movement of the tip of a user's digit on the racetrack surface 250 (i.e., a kind of "touch-and-drag" or "wiping" motion across a portion of the racetrack surface 250), while other particular actions are taken in response to where there is only a touch of a tip of a user's digit on particular ones of the sides 250a-d of the racetrack sensor 250. By way of example, while the racetrack menu 150 is not displayed, touching the side 250a may cause a command to be sent to a source to turn that source on or off, and touching the side 250b may cause an audio portion of an audio/visual program to be muted, while both touching and moving a digit across a portion of the racetrack surface 250 in a "wiping" motion is required to enable the display and use of the racetrack menu 150.

FIGS. 7a and 7b, taken together, depict additional features that may be incorporated into the user interface 1000. Where a selected one of the sources 901-904 displays its own on-screen menu 170 (e.g., a guide concerning audio/visual programs available from that source), either in place of a visual portion of an audio/visual program or overlying a visual portion of an audio/visual program, some embodiments of the user interface 1000 may be augmented to support at least partly integrating the manner in which a user would navigate such an on-screen menu 170 into the user interface 1000. In such embodiments, the touch sensor 220, with its ring shape (whether that ring shape is a rectangular ring shape, or a ring shape of a different geometry), may be configured to surround a set of controls for use in navigating the on-screen menu 170 just as the racetrack menu 150 surrounds the on-screen menu 170, itself.

In particular, FIG. 7b depicts the manner in which the touch sensor 220 disposed on the casing 210 of the remote control 200 of FIG. 1 may surround navigation buttons 270a, 270b, 270c and 270d, as well as a selection button 280, that are also disposed on the casing 210. In alternate variants, other forms of one or more manually-operable controls may be surrounded by the touch sensor 220, in addition to or in place of the navigation buttons 270a-d and the selection button 280, including and not limited to, a joystick, or a four-way rocker switch that may either surround a selection button (such as the selection button 280) or be useable as a selection button by being pressed in the middle. As a result of the ring shape of the touch sensor 220 being employed to surround the navigation buttons 270a-d and the selection buttons 280, a nested arrangement of concentrically located manually operable controls is created. FIG. 7a depicts a form of possible on-screen menu that will be familiar to those skilled in the art, including various menu items 175 that may be selected via the selection button 280, and a marker 180 that may be moved by a user among the menu items 175 via the navigation buttons 270a-d. The concentrically nested arrangement of manually operable controls surrounded by the racetrack menu 250 defined on the touch-sensitive surface 225 of the touch sensor 220 that is disposed on the casing 210 of the remote control 200 corresponds to the similarly nested arrangement of the on-screen menu 170 surrounded by the racetrack menu 150 that is displayed on the display element 120.

Figure 8:
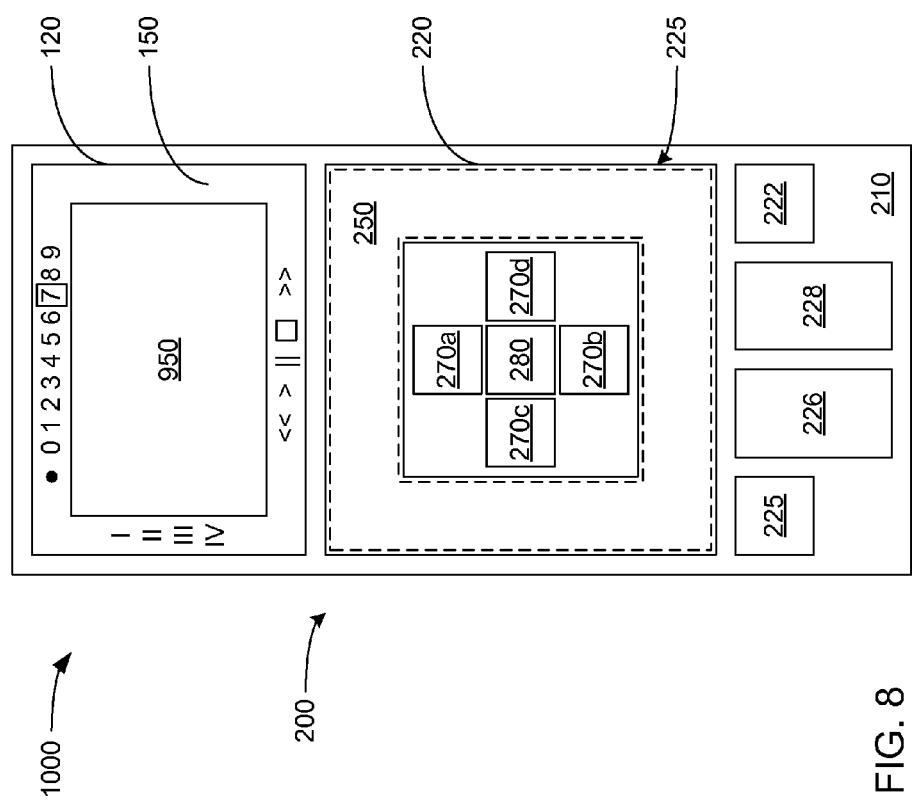
FIG. 8 is a perspective view of the embodiment of the user interface of FIG. 5, additionally incorporating the possible details of FIGS. 7a and 7b.

FIG. 7b also depicts additional controls 222, 225, 226 and 228 that may be employed to perform particular functions where it may be deemed desirable to provide at least some degree of functionality in a manner that does not require the selection of menu items to operate. In one possible variant, the controls 222, 225, 226 and 228 are operable as a power button, a mute button, volume rocker switch and a channel increment/decrement rocker switch, respectively. FIG. 8 depicts a variant of the handheld form of the audio/visual device 100 depicted in FIG. 5 in which the touch sensor 220 is positioned so as to surround the navigation buttons 270a-d and the selection button 280, and in which this variant of the handheld form of the audio/visual device 100 may further incorporate the controls 222, 225, 226 and 228.

Figure 9:
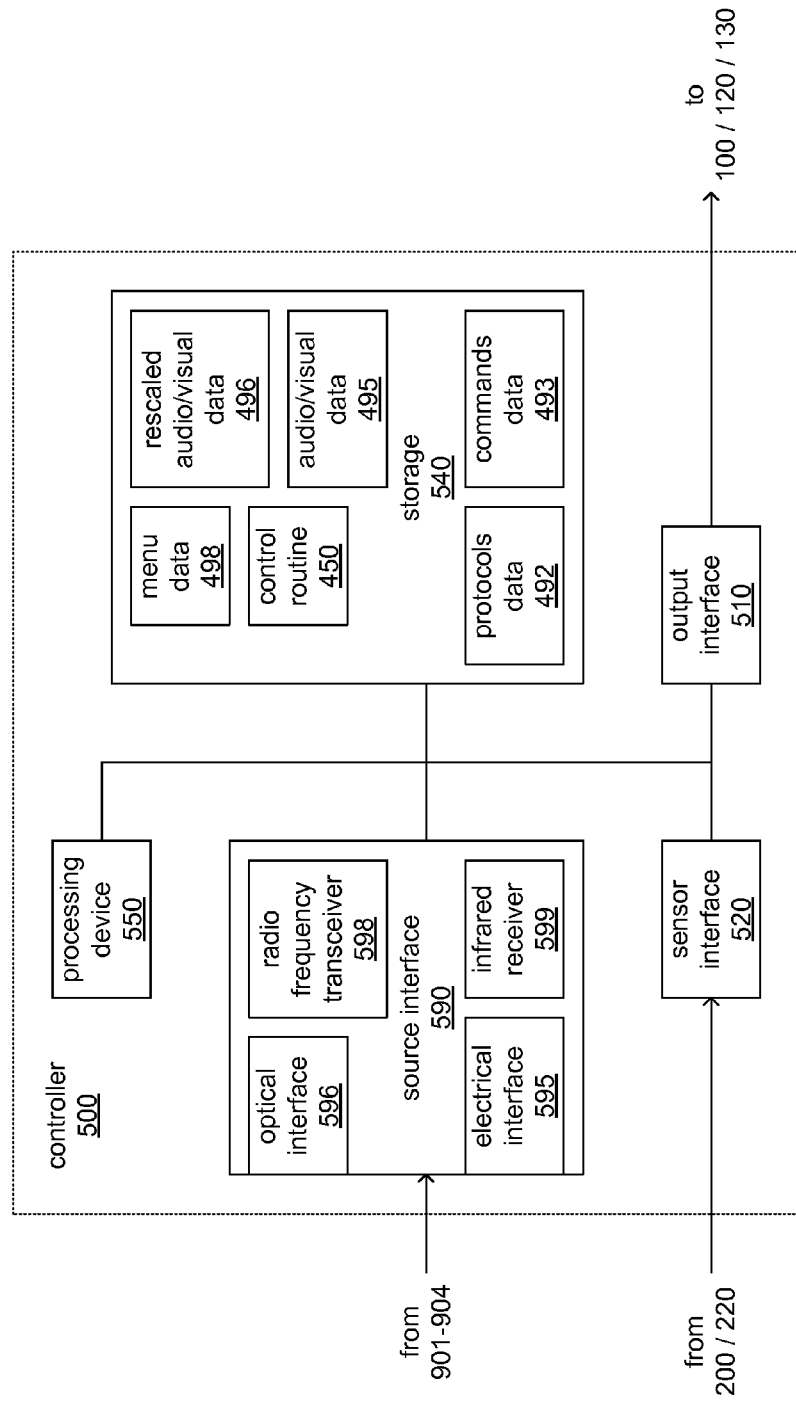
FIG. 9 is a block diagram of the controller of the architecture of FIG. 4.

FIG. 9 is a block diagram of a possible architecture of the controller 500 in which the controller 500 incorporates an output interface 510, a sensor interface 520, a storage 540, a processing device 550 and a source interface 590. The processing device 550 is coupled to each of the output interface 510, the sensor interface 520, the storage 540 and the source interface 590 to at least coordinate the operation of each to perform at least the above-described functions of the controller 500.

The processing device 550 may be any of a variety of types of processing device based on any of a variety of technologies, including and not limited to, a general purpose central processing unit (CPU), a digital signal processor (DSP), a microcontroller, or a sequencer. The storage 540 may be based on any of a variety of data storage technologies, including and not limited to, any of a wide variety of types of volatile and nonvolatile solid-state memory, magnetic media storage, and/or optical media storage. It should be noted that although the storage 540 is depicted in a manner that is suggestive of it being a single storage device, the storage 540 may be made up of multiple storage devices, each of which may be based on different technologies.

Each of the output interface 510, the sensor interface 520 and the source interface 590 may employ any of a variety of technologies to enable the controller 500 to communicate with other devices and/or other components of whatever audio/visual device into which the controller 500 is incorporated. More specifically, where the controller 500 is incorporated into an audio/visual device that also incorporates one or both of a display element (such as the display element 120) and at least one acoustic driver (such as the acoustic drivers 130), the output interface 510 may be of a type able to directly drive a display element with signals causing the display of the racetrack menu 150 and the display area 950 to display visual portions of audio/visual programs, and/or able to directly drive one or more acoustic drivers to acoustically output audio portions of audio/visual programs. Alternatively, where one or both of a display element and acoustic drivers are not incorporated into the same audio/visual device into which the controller 500 is incorporated, the output interface 510 may be of a type employing cabling-based and/or a wireless signaling (perhaps signaling conforming to one of the previously listed industry standards) to transmit a signal to another audio/visual device into which a display element and/or acoustic drivers are incorporated (e.g., the audio/visual device 100).

Similarly, where the controller 500 is incorporated into an audio/visual device into which the touch sensor 220 is also incorporated, the sensor interface 520 may be of a type able to directly receive electrical signals emanating from the touch sensor 220. With such a more direct coupling, the sensor interface 520 may directly monitor a two-dimensional array of touch-sensitive points of the touch-sensitive surface 225 of the touch sensor 220 for indications of which touch-sensitive points are being touched by a tip of a user's digit, and thereby enable the processing device 550 to employ those indications to directly determine where the touch-sensitive surface 225 is being touched. Thus, a determination of whether or not the tip of the digit is touching a portion of the racetrack surface 250 and/or the position 260 by the processing device 550 may be enabled. However, where the controller 500 is incorporated into a device into which the touch sensor 220 is not also incorporated (e.g., the controller 500 is incorporated into the audio/visual device 100 and the touch sensor is incorporated into the remote control 200), the sensor interface 520 may be of a type able to receive cabling-based and/or wireless signaling transmitted by that other device (e.g., infrared signals emitted by the remote control 200). With such a more remote coupling, circuitry (not shown) that is co-located with the touch sensor 220 may perform the task of directly monitoring a two-dimensional array of touch-sensitive points of the touch-sensitive surface 225, and then transmit indications of which touch-sensitive points are being touched by the tip of a user's digit to the sensor interface 520.

Although it is possible that the audio/visual device into which the controller 500 is incorporated may not incorporate any sources (such as the sources 901-904) from which the controller 500 receives audio/visual programs, it is deemed more likely that the audio/visual device into which the controller 500 is incorporated will incorporate one or more of such sources in addition to being capable of receiving audio/visual programs from sources not incorporated into the same audio/visual device. By way of example, it is envisioned that the controller 500 may be incorporated into an audio/visual device into which a radio frequency tuner and/or an Internet access device is also incorporated to enable access to audio/visual programs for selection and playing without the attachment of another audio/visual device, while also having the capability of being coupled to another audio/visual device to receive still other audio/visual programs. In other words, it is envisioned that the controller 500 may well be incorporated into an audio/visual device that is at least akin to a television, whether portable (e.g., as depicted in FIG. 5) or stationary (e.g., as depicted in FIG. 1). Therefore, although the source interface 590 may have any of a number of configurations to couple the controller 500 to any of a number of possible sources, it is envisioned that the source interface 590 will be configured to enable the controller 500 to be coupled to at least one source that is also incorporated into the same audio/visual device into which the controller 500 is incorporated, and to also enable the controller 500 to be coupled to at least one source that is not incorporated into the same audio/visual device.

Thus, the source interface 590 incorporates one or more of an electrical interface 595, an optical interface 596, a radio frequency transceiver 598 and/or an infrared receiver 599. The electrical interface 595 (if present) enables the source interface 590 to couple the controller 500 to at least one source, whether incorporated into the same audio/visual device as the controller 500, or not, to receive electrical signals (e.g., Ethernet, S-Video, USB, HDMI, etc.) conveying an audio/visual program to the controller 500. The optical interface 596 (if present) enables the source interface 590 to couple the controller 500 to at least one source to receive optical signals (e.g., Toslink) conveying an audio/visual program to the controller 500. The radio frequency transceiver 598 (if present) enables the source interface 590 to wirelessly couple the controller 500 to at least one other audio/visual device functioning as a source to receive radio frequency signals (e.g., Bluetooth, a variant of IEEE 802.11, ZigBee, etc.) conveying an audio/visual program to the controller 500 from that other audio/visual device. The infrared receiver 599 (if present) enables the source interface 590 to wirelessly couple the controller 500 to at least one other audio/visual device functioning as a source to receive infrared signals conveying an audio/visual program to the controller 500 from that other source. It should be noted that although the output interface 510 and the sensor interface 520 are depicted as separate from the source interface 590, it may be deemed advantageous, depending on the nature of the signaling supported, to combine one or both of the output interface 510 and the sensor interface 520 with the source interface 590.

Stored within the storage 540 are one or more of a control routine 450, a protocols data 492, a commands data 493, an audio/visual data 495, a rescaled audio/visual data 496, and menu data 498. Upon being executed by the processing device 550, a sequence of instructions of the control routine 450 causes the processing device 550 to coordinate the monitoring of the touch sensor 220 for user input, the output of the racetrack menu 150 to a display element (e.g., the display element 120), the selection of a source of an audio/visual program to be played, and one or both of the display of a visual portion of an audio/visual program on a display element on which the racetrack menu 150 is also displayed and the acoustic output of an audio portion of the audio/visual program via one or more acoustic drivers (e.g., the acoustic drivers 130).

Upon execution, the control routine 450 causes the processing device 550 to operate the sensor interface 520 to await indications of a user placing a tip of a digit in contact with a portion of the racetrack surface 250 defined on a surface of the touch sensor 220, moving that digit about the racetrack surface 250 and/or applying greater pressure at the position 260 on the racetrack surface 250 to make a selection. Upon receiving an indication of activity by the user involving the racetrack surface 250, the processing device 550 may be caused to operate the output interface to display the racetrack menu 150 with one or more of the menu items 155 positioned thereon and surrounding the display area 950 via a display element, if the racetrack menu 150 is not already being displayed. The processing device 550 is further caused to display and position at least the marker 160 on the racetrack menu 150 in a manner that corresponds to the position 260 of the user's digit on the racetrack surface 250. Further, in response to the passage of a predetermined period of time without receiving indications of activity by the user involving the racetrack surface 250, the processing device 550 may be caused to operate the output interface 510 to cease displaying the racetrack menu 150, and to display substantially little else on a display element than the display area 950.

Upon execution, the control routine 450 causes the processing device 550 to operate the sensor interface 520 to await an indication of a selection of a menu item 155 that corresponds to selecting a source from which the user may wish an audio/visual program to be provided for playing, and may operate the source interface 590 to at least enable receipt of an audio/visual program from that selected source. Where an audio/visual program is received, the processing device 550 may be further caused to buffer audio and/or visual portions of the audio/visual program in the storage 540 as the audio/visual data 495. In embodiments in which a visual portion of an audio/visual program is rescaled to be displayed in the display area 950 at a time when the display area 950 is surrounded by the racetrack menu 150, the processing device 550 may be further caused to buffer the rescaled form of the visual portion in the storage as the rescaled audio/visual program data 496.

Upon execution, the control routine 450 causes the processing device 550 to operate the sensor interface 520 to await an indication of a selection of a menu item 155 corresponding to the selection of a command (e.g., "play" or "record" commands, numerals or other symbols specifying a radio frequency channel to tune, etc.) to be transmitted to an audio/visual device serving as a source, and may operate the source interface 590 to transmit a command to that audio/visual device (e.g., one of sources 901-904) that corresponds to a menu item 155 that has been selected. In transmitting that command, the processing device 550 may be further caused to refer to the protocols data 492 for data concerning sequences of signals that must be transmitted by the source interface 590 as part of a communications protocol in preparation for transmitting the command, and/or the processing device 550 may be further caused to refer to the commands data 493 for data concerning the sequence of signals that must be transmitted by the source interface 590 as part of transmitting the command. As will be familiar to those skilled in the art, some of the earlier listed forms of coupling make use of various protocols to organize various aspects of commands and/or data that are conveyed, including and not limited to, Ethernet, Bluetooth, IEEE-1394, USB, etc. In support of the processing device 550 responding to the selection of various ones of the menu items 155, the processing device 550 is further caused to store data correlating at least some of the various menu items with actions to be taken by the processing device 550 in response to their selection by the user in the storage 540 as the menu data 498.

Amidst operating the source interface 590 to enable receipt of an audio/visual program from a source selected by the user, the processing device 550 may be caused to operate the output interface 510 to alter the quantity and/or type of menu items 155 that are displayed at various positions on the racetrack menu 150. In so doing, the processing device 550 may be further caused to store information concerning the size, shape, color and other characteristics of the racetrack menu 150, at least some of the graphical representations of the menu items 155, and/or at least one graphical representation of the marker 160 in the storage 540 as part of the menu data 498.

Figure 10A:
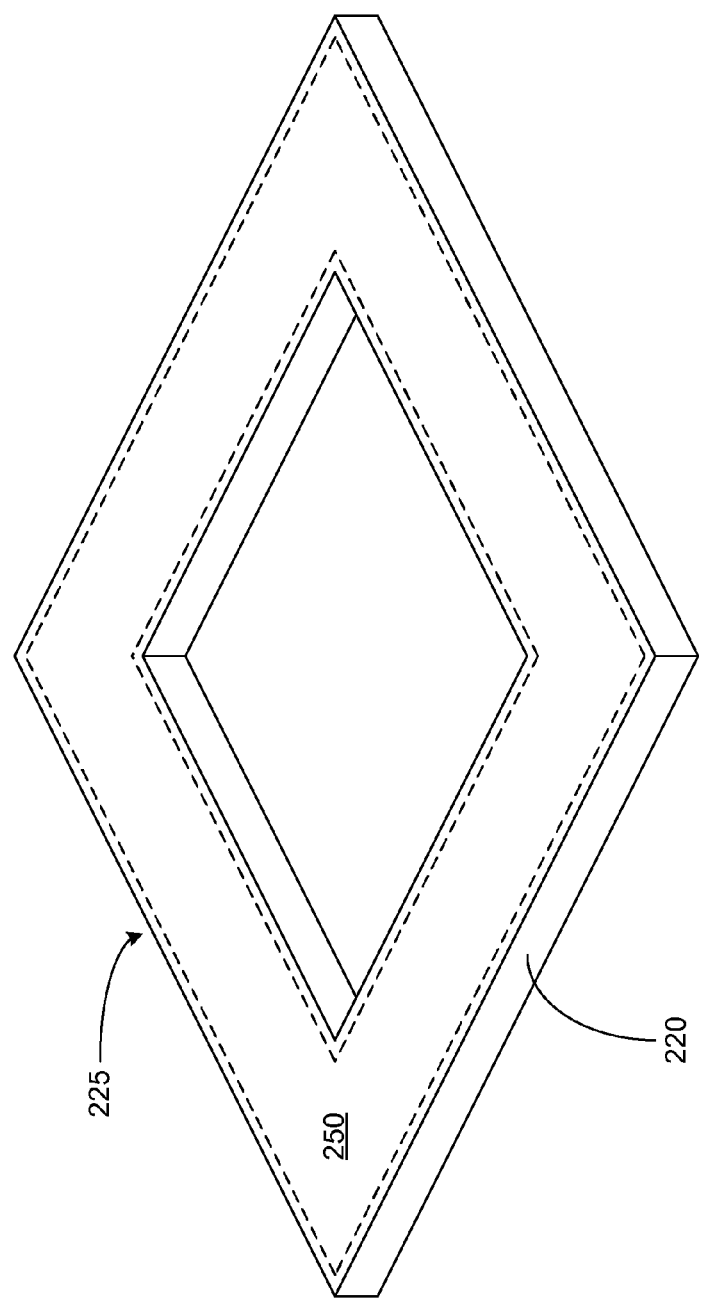
FIGS. 10a and 10b, together, depict possible variants of the touch sensor employed in the user interface of FIG. 1.
Figure 10B:
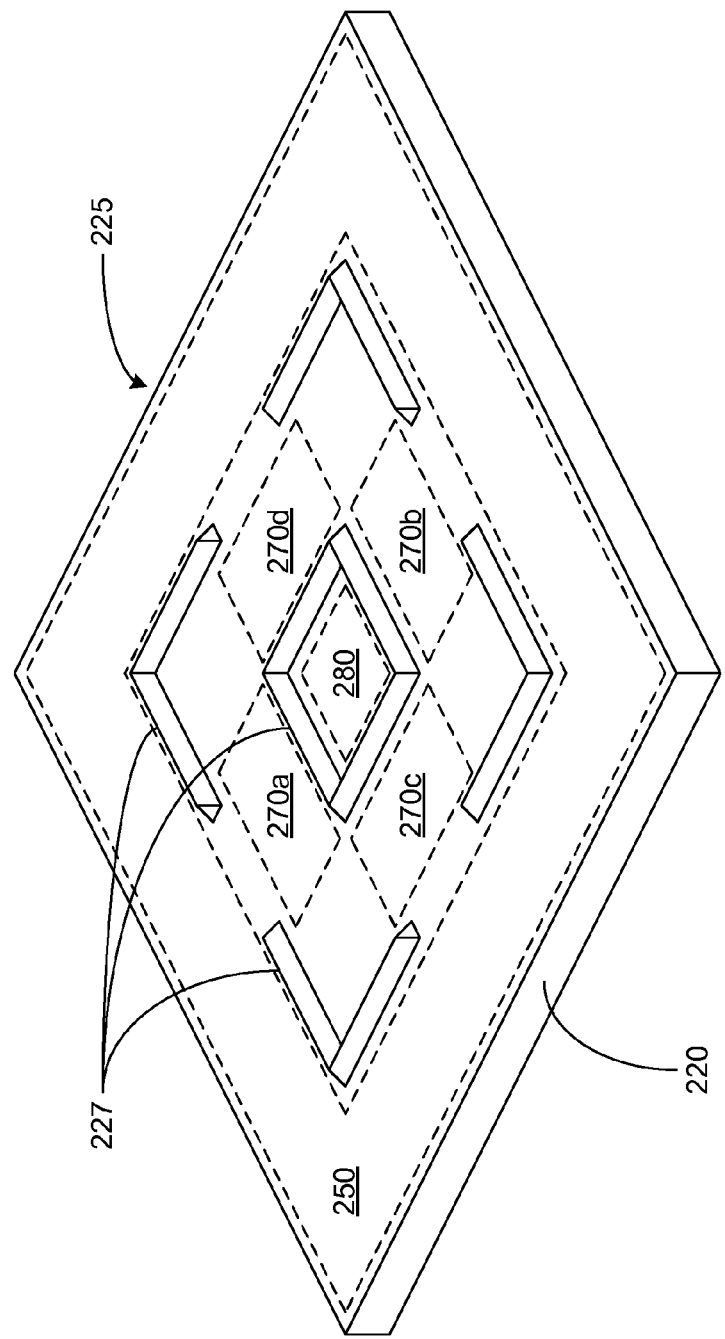

FIGS. 10a and 10b, taken together, depict and contrast two variants of the touch sensor 220. Both variants are depicted in perspective as distinct touch-sensitive devices that are typically mounted within a recess of a casing of a device, including either the casing 110 of any variant of the audio/visual device 100 or the casing 210 of any variant of the remote control 200. However, as those skilled in the art will readily recognize, other touch-sensitive device technologies may yield variants of the touch-sensitive device 220 that are film-like overlays that may be positioned to overlie a portion of a casing or of a circuitboard of a device. The discussion that follows is centered more on the shape and utilization of the touch-sensitive surface 225 of the touch sensor 220, and not on the touch-sensitive technology employed.

FIG. 10a depicts the variant of the touch sensor 220 having the ring shape that has been discussed above at length that permits other manually-operable controls (e.g., the navigation buttons 270a-d and the selection button 280) to be positioned in a manner in which they are surrounded by the ring shape of the touch sensor 220. As has already been discussed, the ring shape of this variant of the touch sensor 220 provides a form of the touch-sensitive surface 225 that is bounded by the ring shape of the touch sensor 220, and this in turn defines the ring shape of the racetrack surface 250 (where the racetrack surface 250 is defined on the touch-sensitive surface 225 to encompass substantially all of the touch-sensitive surface 225). Once again, although this variant of the touch sensor 220 is depicted as having a rectangular ring shape having four sides, other embodiments are possible in which the touch sensor 220 has a ring shape of a different geometry, such as a circular ring shape, an oval ring shape, a hexagonal ring shape, etc.

FIG. 10b depicts an alternate variant of the touch sensor 220 having a rectangular shape that provides a continuous form of the touch-sensitive surface 225 that is bounded by this rectangular shape (i.e., there is no "hole" or formed through the touch-sensitive surface 225). This rectangular shape more easily enables more than the ring shape of the racetrack surface 250 to be defined on the touch-sensitive surface 225 in a manner in which the racetrack surface 250 encompasses only a portion of the touch-sensitive surface 225 and leaves open the possibility of one or more other surfaces that serve other functions also being defined on thereon. In this alternate variant, the ring shape of the racetrack surface 250 may be defined by a processing device executing a sequence of instructions of a routine, such as the processing device 550 executing the control routine 450 in FIG. 9. In other words, the location of the racetrack surface 250 may be defined by a processing device first being provided with indications of which touch-sensitive points of an array of touch-sensitive points making up the touch-sensitive surface 225 are being touched by a tip of a user's digit, and second treating some of those touch-sensitive points as belonging to the racetrack surface 250 and others of those touch-sensitive points as belonging to other surfaces that are defined on the touch-sensitive surface 225 (and which serve other functions).

Alternatively and/or additionally, one or more ridges 227 and/or grooves (not shown) may be formed in the touch-sensitive surface 225 to at least provide a tactile guide as to where the racetrack surface 250 is defined on the touch-sensitive surface 225. Such ridges 227 may be formed integrally with the touch-sensitive surface 225, may be formed as part of a casing on which the touch sensor 220 is disposed, or may be adhered to the touch-sensitive surface 225. Further, such ridges 227 and/or grooves (not shown) may coincide with locations on the touch-sensitive surface 225 at which the touch sensor 220 is incapable of detecting the touch of a tip of a digit (i.e., the touch-sensitive surface 225 may be made up of multiple separate touch-sensitive portions, of which one is a portion having a ring shape where the racetrack surface 250 is defined).

More specifically, and as depicted in dotted lines in FIG. 10b, the racetrack surface 250 is defined on the touch-sensitive surface 225 so as to be positioned about the periphery of the touch-sensitive surface 225 such that the ring shape of the racetrack surface 250 surrounds the remainder of the touch-sensitive surface 225. As also depicted, at least a portion of the touch-sensitive surface 225 that is surrounded by the racetrack surface 250 may be employed to provide the equivalent function of other manually-operable controls, such as the navigation buttons 270a-d and the selection button 280. In other words, the navigation buttons 270a-d and the selection button 280 may be implemented as navigation surfaces and a selection surface, respectively, defined on the touch-sensitive surface of the touch sensor 220 (perhaps by a processing device executing a sequence of instructions), along with the racetrack surface 250.

It should be noted that although both of the variants of the touch sensor 220 have been depicted in FIGS. 10a and 10b as having rectangular shapes with right angle corners, either variant may alternatively have rounded corners. Indeed, where such a variant of the touch sensor 220 has one or more of the ridges 227 and/or grooves (not shown), such ones of the ridges 227 and/or grooves may also have rounded corners, despite being depicted as having right angle corners in FIGS. 10a and 10b.

Figure 11A:
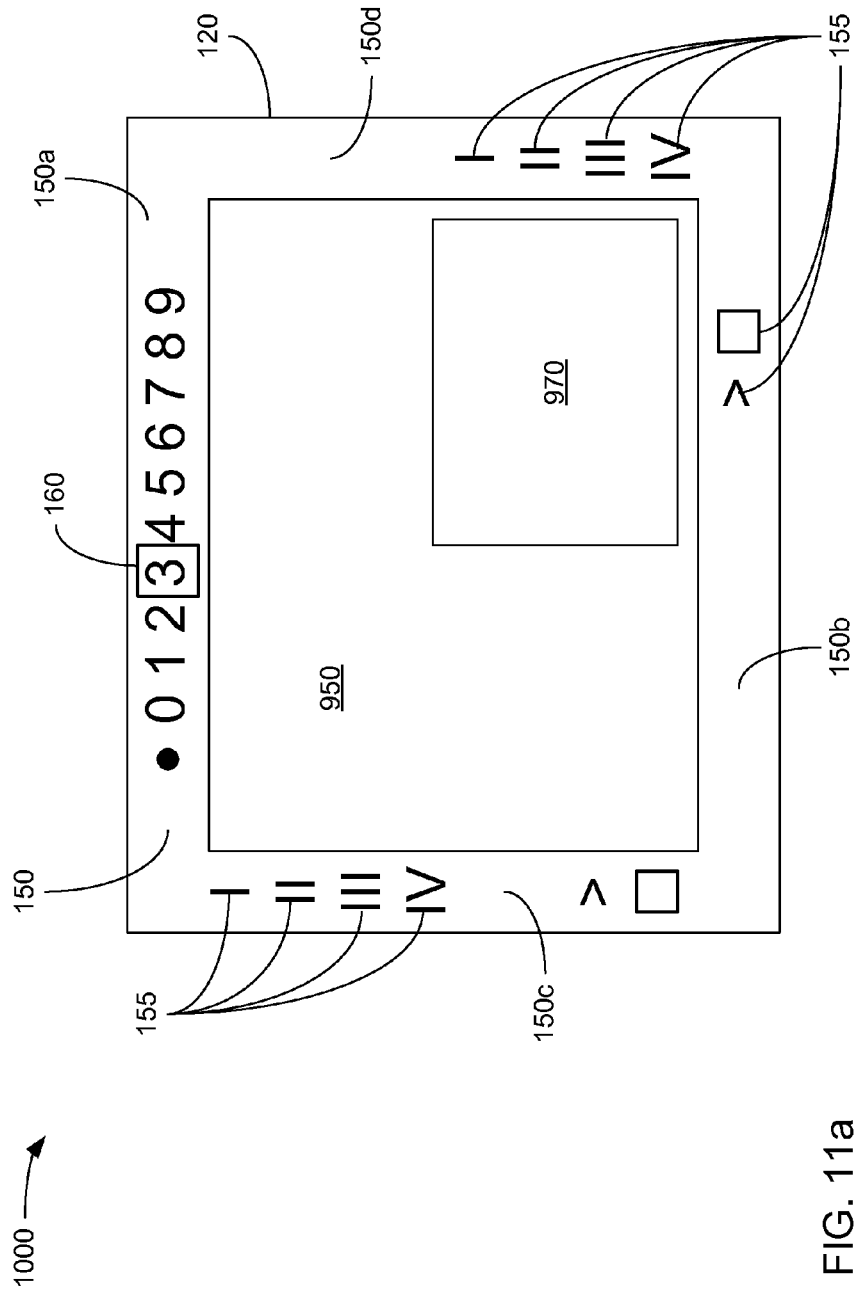
FIGS. 11a and 11b, together, depict possible variants of the user interface of FIG. 1 incorporating more than one display area.
Figure 11B:
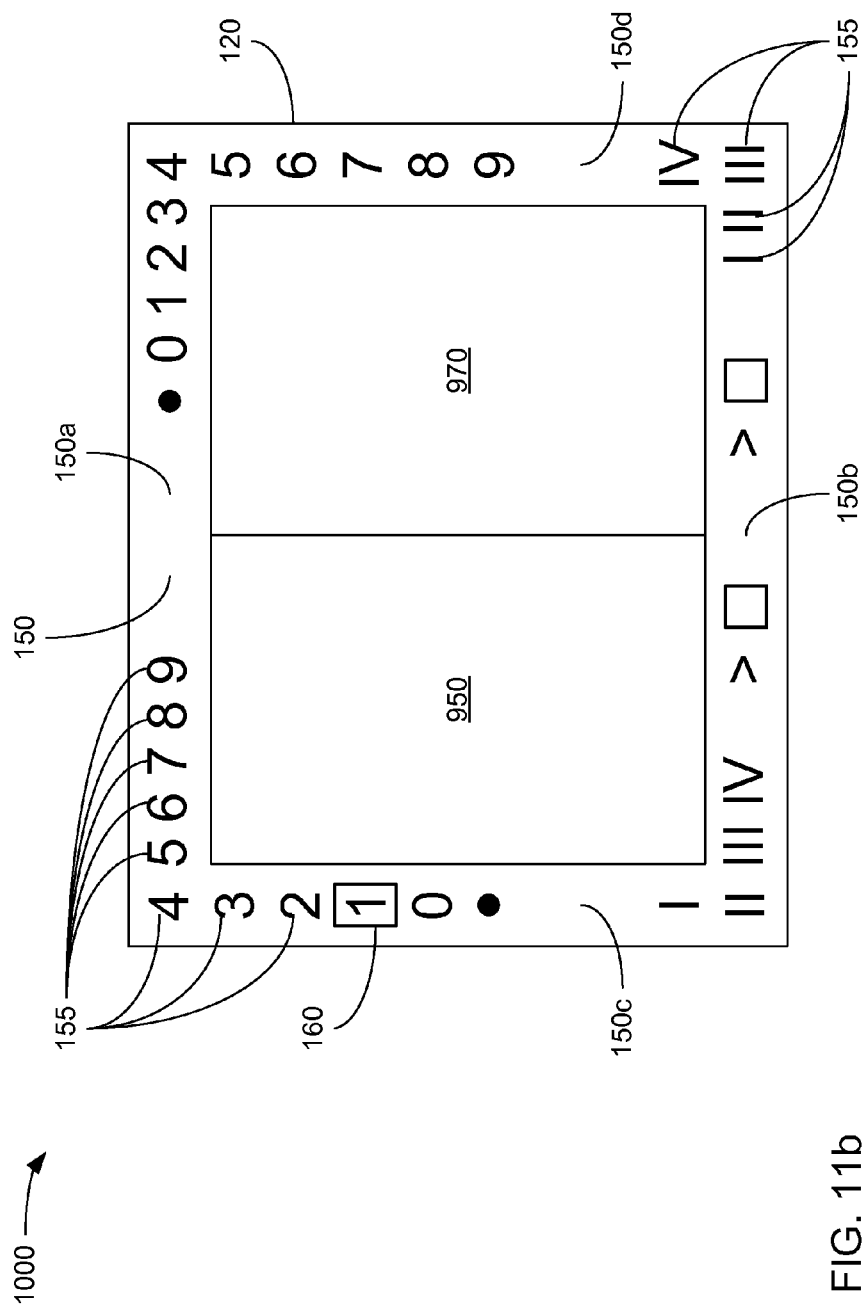

FIGS. 11a and 11b, taken together, depict two variants of the user interface 1000 in which more than one display area is defined within the portion of the display element 120 that is surrounded by the racetrack menu 150. These variants enable more than one visual portion of one or more selected audio/visual programs to be played on the display element 120 in a manner that enables a user to view them simultaneously. Also depicted is the manner in which various ones of the menu items 155 associated within only one of the display areas may be positioned along the racetrack menu 150 to provide a visual indication of their association with that one of the display areas.

More specifically, FIG. 11a depicts a configuration that is commonly referred to as "picture-in-picture" in which a display area 970 having smaller dimensions than the display area 950 is positioned within and overlies a portion of the display area 950. As also depicted, ones of the menu items 155 that are associated with the visual portion displayed in the display area 970 are positioned along portions of the racetrack menu 150 that are located closer to the display area 970 (specifically, portions of the sides 150b and 150d) to provide a visual indication to the user of that one association. Further, ones of the menu items 155 that are associated with the visual portion displayed in the display area 950 are positioned along portions of the racetrack menu 150 that are further from the display area 970 (specifically, the sides 150a and 150c) to provide a visual indication to the user of that other association. As suggested in the depiction of FIG. 11a, the ones of the menu items 155 that are associated with the display area 950 correspond to commands to play or to stop playing an audio/visual program, selection of an input, and radio frequency channel tuning. The ones of the menu items 155 that are associated with the display area 970 correspond to commands to play or to stop playing an audio/visual program, and selection of an input.

Also more specifically, FIG. 11b depicts a configuration that is commonly referred to as "picture-by-picture" in which the display areas 950 and 970 are positioned adjacent each other (as opposed to one overlapping the other) within the portion of the display element surrounded by the racetrack menu 150. Again as depicted, ones of the menu items 155 that are associated with the visual portion displayed in the display area 950 are positioned along portions of the racetrack menu 150 that are located closer to the display area 950 (specifically, the side 150c and portions of the sides 150a and 150b) to provide a visual indication to the user of that one association. Further, ones of the menu items 155 that are associated with the visual portion displayed in the display area 970 are positioned along portions of the racetrack menu 150 that are located closer to the display area 970 (specifically, the side 150d and portions of the sides 150a and 150b) to provide a visual indication to the user of that other association. As suggested in the depiction of FIG. 11b, each of the display areas 950 and 970 are associated with separate ones of the menu items 155 that correspond to commands to play or to stop playing an audio/visual program, selection of an input, and radio frequency channel tuning.

Although FIGS. 11a and 11b depict embodiments having only two display areas (i.e., the display areas 950 and 970) within the portion of the display element 120 surrounded by the racetrack menu 150, those skilled in the art will readily recognize that other embodiments incorporating more than two such display areas are possible, and that in such embodiments, each of the menu items 155 may be positioned along the racetrack menu 150 in a manner providing a visual indication of its association with one of those display areas. Indeed, it is envisioned that variants of the user interface 1000 are possible having 2-by-2 or larger arrays of display areas to accommodate the simultaneous display of multiple visual portions, possibly in security applications.

Although FIGS. 11a and 11b depict separate sets of the menu items 155 corresponding to commands to play and to stop playing an audio/visual program that are separately associated with each of the display areas 150 and 170, and although this suggests that the visual portions played in each of the display areas 150 and 170 must be from different audio/visual programs, it should be noted that the simultaneously displayed visual portions in the display areas 150 and 170 may be of the same audio/visual program. As those skilled in the art will readily recognize, an audio/visual program may have more than one visual portion. An example of this may be an audio/visual program including video of an event taken from more than one angle, such as an audio/visual program of a sports event where an athlete is shown in action from more than one camera angle. In such instances, there may be only one set of the menu items 155 corresponding to commands to play, fast-forward, rewind, pause and/or to stop playing the single audio/visual program, instead of the separate sets of menu items depicted FIGS. 11a and 11b.

With the simultaneous display of multiple visual portions, there may be multiple audio portions that each correspond to a different one of the visual portions. While viewing multiple visual portions simultaneously may be relatively easy for a user insofar as the user is able to choose any visual program to watch with their eyes, listening to multiple audio portions simultaneously may easily become overwhelming. To address this, some embodiments may select one of the audio portions to be acoustically output to the user based on the position 260 of a tip of a digit along the racetrack surface 250 (referring back to FIG. 2). Where the position 260 at which the user places a tip of a digit on the racetrack surface 250 corresponds to a portion of the racetrack menu 150 that is closer to the display area 950, then an audio portion of the audio/visual program of the visual portion being displayed in the display area 950 is acoustically output to the user. If the user then moves that tip of a digit along the racetrack surface 250 such that the position 260 is moved to a portion of the racetrack surface 250 that corresponds to a portion of the racetrack menu 150 that is closer to the display area 970, then an audio portion of the audio/visual program of the visual portion being displayed in the display area 970 is acoustically output to the user. As the selection of audio portion that is acoustically output to the user changes as the user moves the tip of a digit about the racetrack surface 250, the corresponding position of the marker 160 along the racetrack menu 150 may serve as a visual indication to the user of which visual portion the current selection of audio portion corresponds to.

Figure 12:
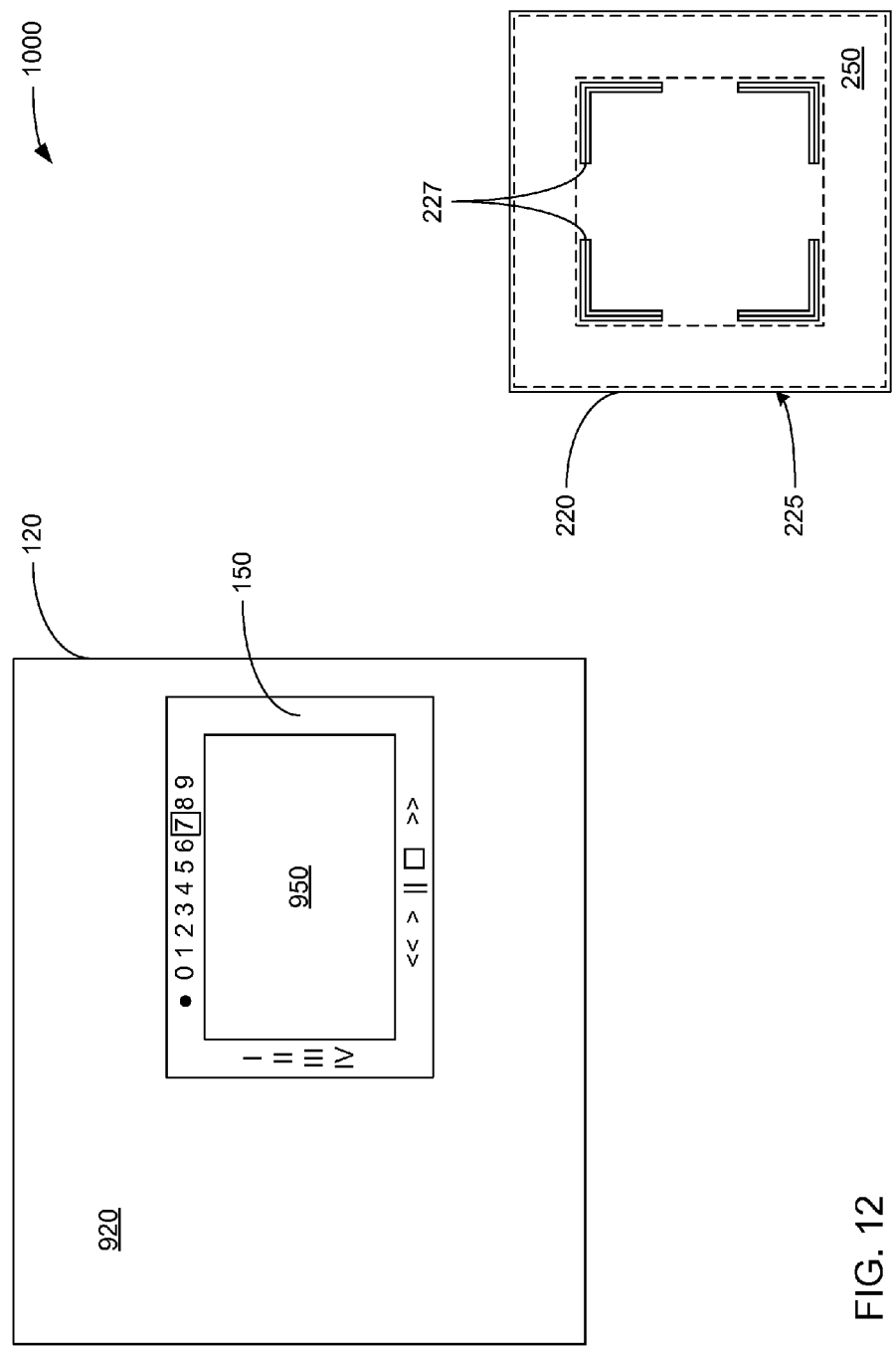
FIG. 12 depicts another embodiment of the user interface of FIG. 1 in which the racetrack menu and the display area surrounded by the racetrack menu do not occupy substantially all of a display element.

FIG. 12 depicts an alternate variant of the user interface 1000 in which the combined display of the racetrack menu 150 and the display area 950 surrounded by the racetrack menu 150 does not fill substantially all of the display element 120. Such an embodiment may be implemented on a more complex variant of the audio/visual device 100 capable of simultaneously performing numerous functions, some of which are entirely unrelated to selection and playing of an audio/visual program. As depicted, this leaves a display area 920 that is outside the racetrack menu 150 and that is overlain by the combination of the racetrack menu 150 and the display area 950 available for such unrelated functions. Such a more complex variant of the audio/visual device 100 may be a general purpose computer system, perhaps one employed as a "media center system" or "whole house entertainment system." In such an embodiment, the combination of the racetrack menu 150 and the display area 950 may be displayed in a window defined by an operating system having a windowing graphical user interface where the window occupies substantially less than all of the display element 120.

As also depicted in FIG. 12, in such an embodiment, the user may select and control the playing of an audio/visual program through the use of a variant of the touch sensor 220 having a touch-sensitive surface 225 that has a continuous rectangular shape (such as the variant of the touch sensor 220 of FIG. 10b), as opposed to having a ring shape (such as the variant of the touch sensor 220 of FIG. 10a). The racetrack surface 250 is defined on the touch-sensitive surface 225 in a manner that occupies the periphery of the touch-sensitive surface 225 and that surrounds a remaining portion of the touch-sensitive surface 225 that enables conventional operation of other functions of the audio/visual device 100 that may be unrelated to the selection and playing of an audio/visual program. In essence, this remaining portion of the touch-sensitive surface 225 may be employed in a conventional manner that will be familiar to those skilled in the art of graphical user interfaces in which a user moves about a graphical cursor using a tip of a digit placed on this remaining portion. Thus, the user may choose to engage in selecting audio/visual programs and controlling the playing of those audio/visual programs through the racetrack surface 250, and may choose to engage in performing other tasks unrelated to the selection and playing of audio/visual programs through the remaining portion of the touch-sensitive surface 225.

To provide tactile guidance to the user as to the location of the racetrack surface 250, one or more ridges 227 and/or grooves (not shown) may be formed in the touch-sensitive surface 225. In this way, the user may be aided in unerringly placing a tip of a digit on whichever one of the racetrack surface 250 or the remaining portion of the touch-sensitive surface 225 that they wish to place that tip upon, without errantly placing that tip on both, and without having to glance at the touch-sensitive surface 225 of the touch sensor 220.

Other implementations are within the scope of the following claims and other claims to which the applicant may be entitled.

What is claimed is:

1. An apparatus comprising:
a display element capable of visually displaying a visual portion of an audio/visual program and a racetrack menu having a ring shape;
a processing device; and
a storage accessible to the processing device and storing a sequence of instructions that when executed by the processing device, causes the processing device to:
cause the racetrack menu to be visually displayed on the display element such that the racetrack menu surrounds a first display area in which the visual portion of the audio/visual program may be visually displayed;
cause a plurality of menu items to be visually displayed in the racetrack menu;
cause a first marker to be visually displayed in the racetrack menu;
receive an indication that a first manually-operable control is being operated to move the first marker;
in response to the indication of the first manually-operable control being operated to move the first marker, move the first marker about the racetrack menu and constrain movement of the first marker to remain within the racetrack menu;
receive an indication of the first manually-operable control being operated to select a menu item of the plurality of menu items that is in the vicinity of the first marker at a time subsequent to the first manually-operable control being operated to move the first marker about the racetrack; and
in response to the indication of the first manually-operable control being operated to select the menu item that is in the vicinity of the first marker, cause the menu item to be selected, wherein causing the menu item to be selected comprises taking an action to cause the audio/visual program to be selected for playing, wherein the first manually-operable control is a touch sensor having a touch-sensitive surface that is manually operable with a digit of a hand, and wherein execution of the sequence of instructions by the processing device further causes the processing device to:
cause the racetrack menu to be visually displayed in response to an indication of the digit touching the touch-sensitive surface followed by an indication of the digit remaining in contact with the touch-sensitive surface for at least a predetermined period of time at a time when the racetrack menu is not being visually displayed; and
cause a command concerning playing the audio/visual program to be transmitted to a source of the audio/visual program in response to an indication of the digit touching the touch-sensitive surface followed by an indication of the digit ceasing to touch the touchsensitive surface at a time when the racetrack menu is not being visually displayed.

2. The apparatus of claim 1, wherein execution of the sequence of instructions by the processing device further causes the processing device to:
cause the racetrack menu to be visually displayed in response to an indication of the digit touching the touch-sensitive surface followed by an indication of the digit moving about the touch-sensitive surface in a wiping motion at a time when the racetrack menu is not being visually displayed; and
cause a command concerning playing the audio/visual program to be transmitted to a source of the audio/visual program in response to an indication of the digit touching the touch-sensitive surface followed by an indication of the digit ceasing to touch the touch-sensitive surface at a time when the racetrack menu is not being visually displayed.

3. The apparatus of claim 1, wherein execution of the sequence of instructions by the processing device further causes the processing device to:
cause a second marker to be visually displayed in the vicinity of the first marker in response to an indication of the digit touching the touch-sensitive surface; and
move the second marker to a position relative to the first marker such that the position of the second marker relative to the first marker more precisely indicates the position where the digit is touching the touch-sensitive surface than does the position of the first marker within the racetrack menu in response to an indication of the digit moving about the touch-sensitive surface in a wiping motion.

4. The apparatus of claim 1, further comprising a source interface operable to select a source from which to receive an audio/visual program, wherein the action taken to cause the audio/visual program to be selected for playing is selected from the group of actions consisting of:
selecting the source interface to enable receipt of the audio/visual program from the source through the source interface;
transmitting a command through the source interface to the source to select the audio/visual program from among a plurality of audio/visual programs available from the source; and
transmitting a command through the source interface to the source to cause the source to provide the audio/visual program to the apparatus as part of playing the audio/visual program.

5. The apparatus of claim 4, wherein transmitting a command through the source interface to the source to select the audio/visual program from among the plurality of audio/visual programs available from the source comprises causing the source to operate a radio frequency tuner to receive the audio/visual program.

6. The apparatus of claim 4, wherein transmitting a command through the source interface to the source to select the audio/visual program from among the plurality of audio/visual programs available from the source comprises causing the source to begin playing the audio/visual program from a storage medium accessible to the source.

7. The apparatus of claim 1, wherein execution of the sequence of instructions by the processing device further causes the processing device to move the first marker about the racetrack menu in a manner in which the first marker snaps between being in the vicinity of a first menu item of the plurality of menu items and being in the vicinity of a second menu item of the plurality of menu items.

8. The apparatus of claim 7, wherein the processing device is further caused to operate an acoustic driver to acoustically output a sound at each instance of the first marker snapping between the vicinities of the first and second menu items.

9. The apparatus of claim 1, wherein execution of the sequence of instructions by the processing device further causes the processing device to alter a dimension of the size of the first marker as the processing device is caused to move the first marker about the racetrack menu between the vicinity of a first menu item of the plurality of menu items and the vicinity of a second menu item of the plurality of menu items.

10. The apparatus of claim 1, wherein the first marker has a form selected from the group consisting of:
an arrow pointer pointing at a menu item of the plurality of menu items;
a box surrounding a menu item of the plurality of menu items; and
an alteration to the appearance of a menu item of the plurality of menu items that is distinct from the appearance of other menu items of the plurality of menu items.

11. The apparatus of claim 1, wherein:
the racetrack menu has a rectangular ring shape having four sides; and
execution of the sequence of instructions by the processing device further causes the processing device to:
receive an indication that the first manually-operable control is being operated; and
cause a second marker to be visually displayed in the racetrack menu in the vicinity of one of the four sides of the rectangular ring shape of the racetrack menu to visually indicate which one of the four sides the first marker is currently located within.

12. The apparatus of claim 1, wherein execution of the sequence of instructions by the processing device further causes the processing device to:
cause both the first display area and a second display area to be displayed on the display element in a manner in which both the first and second display areas are surrounded by the racetrack menu;
cause a first menu item that is associated with a visual portion of an audio/visual program being played in the first display area to be located in a first portion of the racetrack menu located closer to the first display area than a second portion of the racetrack menu; and
cause a second menu item that is associated with a visual portion of an audio/visual program being played in the second display area to be located in the second portion of the racetrack menu.

13. The apparatus of claim 12, wherein the first display area is positioned to overlie a portion of the second display area.

14. The apparatus of claim 12, wherein the first display area and the second display area positioned to adjacent to each other in a manner in which neither of the first and second display areas overlie the other.

15. The apparatus of claim 1, wherein execution of the sequence of instructions by the processing device further causes the processing device to:
cause the racetrack menu to be visually displayed on the display element in response to receiving any indication of any manual operation of the first manually-operable control; and
cause the racetrack menu to cease to be visually displayed on the display element in response to a predetermined period of time having elapsed without any receipt of any indication of any manual operation of the first manually-operable control.

16. A method comprising:
visually displaying a racetrack menu having a ring shape on a display element that is capable of visually displaying both the racetrack menu and a visual portion of an audio/visual program such that the racetrack menu surrounds a first display area in which the visual portion of the audio/visual program may be visually displayed;
visually displaying a plurality of menu items in the racetrack menu;
visually displaying a first marker in the racetrack menu;
receiving an indication that a first manually-operable control is being operated to move the first marker;
in response to the indication of the first manually-operable control being operated to move the first marker, moving the first marker about the racetrack menu and constraining movement of the first marker to remain within the racetrack menu;
receiving an indication of the first manually-operable control being operated to select a menu item of the plurality of menu items that is in the vicinity of the first marker at a time subsequent to the first manually-operable control being operated to move the first marker about the racetrack;
in response to the indication of the first manually-operable control being operated to select the menu item that is in the vicinity of the first marker, selecting the menu item, wherein selecting the menu item comprises taking an action to cause the audio/visual program to be selected for playing;
displaying both the first display area and a second display on the display element in a manner in which both the first and second display areas are surrounded by the racetrack menu;
where a first menu item is associated with a visual portion of an audio/visual program being played in the first display area, displaying the first menu item in a first portion of the racetrack menu located closer to the first display area than a second portion of the racetrack menu;
where a second menu item is associated with a visual portion of an audio/visual program being played in the second display area, displaying the second menu item in the second portion of the racetrack menu; and
positioning the first display area and the second display area adjacent to each other in a manner in which neither of the first and second display areas overlie the other.

17. The method of claim 16, further comprising:
visually displaying the racetrack menu in response to receiving an indication of a digit of a hand touching a touch-sensitive surface of the first manually-operable control followed by an indication of the digit moving about the touch-sensitive surface in a wiping motion at a time when the racetrack menu is not being visually displayed; and
transmitting a command concerning playing the audio/visual program to a source of the audio/visual program in response to an indication of the digit touching the touch-sensitive surface followed by an indication of the digit ceasing to touch the touch-sensitive surface at a time when the racetrack menu is not being visually displayed.

18. The method of claim 16, further comprising:
visually displaying the racetrack menu in response to receiving an indication of a digit of a hand touching a touch-sensitive surface of the first manually-operable control followed by an indication of the digit remaining in contact with the touchsensitive surface for at least a predetermined period of time at a time when the racetrack menu is not being visually displayed; and
transmitting a command concerning playing the audio/visual program to a source of the audio/visual program in response to an indication of the digit touching the touch-sensitive surface followed by an indication of the digit ceasing to touch the touch-sensitive surface at a time when the racetrack menu is not being visually displayed.

19. The method of claim 16, wherein the action taken to cause the audio/visual program to be selected for playing is selected from the group of actions consisting of:
selecting a source interface to enable receipt of the audio/visual program from a source of the audio/visual program through the source interface;
transmitting a command through the source interface to the source to select the audio/visual program from among a plurality of audio/visual programs available from the source; and
transmitting a command through the source interface to the source to cause the source to provide the audio/visual program to the apparatus as part of playing the audio/visual program.

20. The method of claim 19, wherein transmitting a command through the source interface to the source to select the audio/visual program from among the plurality of audio/visual programs available from the source comprises causing the source to operate a radio frequency tuner to receive the audio/visual program.

21. The method of claim 19, wherein transmitting a command through the source interface to the source to select the audio/visual program from among the plurality of audio/visual programs available from the source comprises causing the source to begin playing the audio/visual program from a storage medium accessible to the source.

22. The method of claim 16, further comprising moving the first marker about the racetrack menu in a manner in which the first marker snaps between being in the vicinity of a first menu item of the plurality of menu items and being in the vicinity of a second menu item of the plurality of menu items.

23. The method of claim 22, further comprising operating an acoustic driver to acoustically output a sound at each instance of the first marker snapping between the vicinities of the first and second menu items.

24. The method of claim 16, wherein the racetrack menu has a rectangular ring shape having four sides, and further comprising:
receiving an indication that the first manually-operable control is being operated; and
causing a second marker to be visually displayed in the racetrack menu in the vicinity of one side of the four sides of the rectangular ring shape of the racetrack menu to visually indicate which one of the four sides the first marker is currently located within.

25. The method of claim 16, further comprising positioning the first display area to overlie a portion of the second display area.

26. The method of claim 16, further comprising:
visually displaying the racetrack menu on the display element in response to receiving any indication of any manual operation of the first manually-operable control; and
ceasing to visually display the racetrack menu on the display element in response to a predetermined period of time having elapsed without any receipt of any indication of any manual operation of the first manually-operable control.

\* \* \* \* \*